United States Patent [19]

Lam

[11] Patent Number: 6,001,750
[45] Date of Patent: Dec. 14, 1999

[54] FIBROUS LINING MATERIAL COMPRISING A PRIMARY LAYER HAVING LESS FIBRILLATED ARAMID FIBERS, CARBON FIBERS, CARBON PARTICLES AND A SECONDARY LAYER COMPRISING CARBON PARTICLES

[75] Inventor: Robert C. Lam, Naperville, Ill.

[73] Assignee: Borg-Warner Automotive, Inc., Troy, Mich.

[21] Appl. No.: 09/275,301

[22] Filed: Mar. 24, 1999

Related U.S. Application Data

[63] Continuation-in-part of application No. 08/704,899, Aug. 30, 1996, which is a continuation of application No. 08/534,978, Sep. 28, 1995, abandoned, which is a continuation-in-part of application No. 08/253,727, Jun. 3, 1994, Pat. No. 5,753,356, which is a continuation-in-part of application No. 08/101,951, Aug. 4, 1993, abandoned.

[51] Int. Cl.⁶ .............................. B32B 27/20; B05D 1/36
[52] U.S. Cl. .......................... 442/72; 442/73; 442/153; 442/157; 442/161; 442/169; 442/176; 442/179; 442/415; 442/416; 442/417
[58] Field of Search ................ 442/72, 73, 153, 442/157, 161, 169, 176, 179, 415, 416, 417; 427/202, 203

[56] References Cited

U.S. PATENT DOCUMENTS

| | | | |
|---|---|---|---|
| 2,182,208 | 12/1939 | Nason et al. | 260/19 |
| 2,779,668 | 1/1957 | Daniels et al. | 51/298 |
| 3,215,648 | 11/1965 | Duffy et al. | 260/2.1 |
| 3,270,846 | 9/1966 | Arledter et al. | 192/107 |
| 3,746,669 | 7/1973 | Dummom et al. | 260/3 |
| 3,899,050 | 8/1975 | Savary et al. | 188/73.1 |
| 3,911,045 | 10/1975 | Hartmann et al. | 260/826 |
| 3,927,241 | 12/1975 | Augustin | 428/408 |
| 3,980,729 | 9/1976 | Yokokawa et al. | 260/826 |
| 4,020,226 | 4/1977 | Andrianov et al. | 428/290 |
| 4,051,097 | 9/1977 | Aldrich | 260/38 |
| 4,256,801 | 3/1981 | Chuluda | 428/280 |
| 4,259,397 | 3/1981 | Saito et al. | 428/288 |
| 4,320,823 | 3/1982 | Covaleski | 192/107 |
| 4,324,706 | 4/1982 | Tabe et al. | 523/149 |
| 4,352,750 | 10/1982 | Eschen | 523/156 |
| 4,373,038 | 2/1983 | Moraw et al. | 523/156 |
| 4,374,211 | 2/1983 | Gallagher et al. | 523/156 |
| 4,451,590 | 5/1984 | Fujimaki et al. | 523/155 |
| 4,456,650 | 6/1984 | Melotik et al. | 428/290 |
| 4,457,967 | 7/1984 | Chareire et al. | 428/212 |
| 4,514,541 | 4/1985 | Frances | 524/514 |
| 4,558,089 | 12/1985 | Koyama et al. | 428/367 |
| 4,563,386 | 1/1986 | Schwartz | 428/283 |
| 4,593,802 | 6/1986 | Danko, Jr. | 192/107 M |
| 4,628,001 | 12/1986 | Sasaki et al. | 428/367 |
| 4,646,900 | 3/1987 | Crawford et al. | 192/107 R |
| 4,656,203 | 4/1987 | Parker | 523/155 |
| 4,657,951 | 4/1987 | Takarada et al. | 523/153 |
| 4,663,230 | 5/1987 | Tennent | 428/367 |
| 4,663,368 | 5/1987 | Harding et al. | 523/155 |
| 4,672,082 | 6/1987 | Nakagawa et al. | 523/153 |
| 4,694,937 | 9/1987 | Jonas | 188/73.1 |
| 4,700,823 | 10/1987 | Winckler | 192/107 M |
| 4,743,634 | 5/1988 | Royer | 523/150 |
| 4,792,361 | 12/1988 | Double et al. | 106/97 |
| 4,918,116 | 4/1990 | Gardziella et al. | 523/149 |
| 4,983,457 | 1/1991 | Hino et al. | 428/367 |
| 5,004,497 | 4/1991 | Shibata et al. | 75/229 |
| 5,033,596 | 7/1991 | Genise | 192/53 |
| 5,080,969 | 1/1992 | Tokumura | 428/327 |
| 5,083,650 | 1/1992 | Seiz et al. | 192/107 |
| 5,093,388 | 3/1992 | Siemon, Jr. et al. | 523/149 |
| 5,290,627 | 3/1994 | Ikuta | 428/251 |
| 5,585,166 | 12/1996 | Kearsey . | |

FOREIGN PATENT DOCUMENTS

| | | |
|---|---|---|
| 0180381A3 | 7/1986 | European Pat. Off. . |
| 0202145 | 11/1986 | European Pat. Off. . |
| 0637698 | 2/1995 | European Pat. Off. . |
| 0669482A3 | 2/1995 | European Pat. Off. . |
| 0695887 | 2/1996 | European Pat. Off. . |
| 0766019A1 | 4/1997 | European Pat. Off. . |
| 2828918 | 1/1979 | Germany . |
| 4211010 | 10/1992 | Germany . |
| 58180573 | 10/1981 | Japan . |
| 59-103040 | 6/1984 | Japan . |
| 3150266 | 6/1991 | Japan . |
| 6299434 | 9/1994 | Japan . |
| 1054890 | 1/1967 | United Kingdom . |
| 2224285A | 2/1990 | United Kingdom . |
| 2241246A | 8/1991 | United Kingdom . |
| WO 95/26473 | 10/1995 | WIPO . |

OTHER PUBLICATIONS

A. Knop, W. Scheib, Chemistry and Application of Phenolic Resins, Springer–Verlag, Berlin Heidelberg, NY (1979), pp. 230–232.

Artificial Graphite, Material Safety Data Sheet, prepared Jun. 7, 1991, U.S. Dept. of Labor.

AKZO, Material Safety Data Sheet, prepared Jul. 11, 1991 pp. 1–4.

Jack J. Pigliacamp, Organic Fibers, pp. 54 & 55, E. I. Du Pont de Nemours & Company, Inc. (No Date).

Freeness of Pulp, T 227 om–85, 1985 TAPPI.

European Search Report—dated Nov. 22, 1994 for EP 94 30 5407.

European Search Report—dated May 4, 1994 for EP 93 11 8967.

European Search Report—dated Dec. 19, 1996 for EP 96 30 6350.8.

*Primary Examiner*—Christopher Raimund
*Attorney, Agent, or Firm*—Emch, Schaffer, Schaub & Porcello Co. LPA; Greg Dziegielewski

[57] ABSTRACT

The present invention relates to a fibrous base material comprising a primary layer of less fibrillated aramid fibers, carbon particles, carbon fibers, phenolic novoloid fibers, and at least one filler material, optionally cotton fibers, and a secondary layer of carbon particles on at least one surface of the fibrous base material for use in a non-asbestos friction material. In certain embodiments, the fibrous base material is impregnated with a phenolic or phenolic-based resin material, including, for example, a mixture of a phenolic resin and a silicone resin to form a friction material having an extended high speed durability life, good "break-in" characteristics, good heat dissipation characteristics, and good noise or squawk resistance.

25 Claims, 14 Drawing Sheets

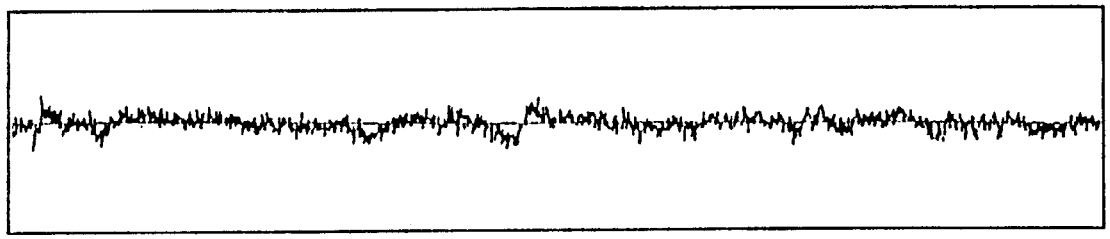
FIG. 2      Ra 6.0 μ in
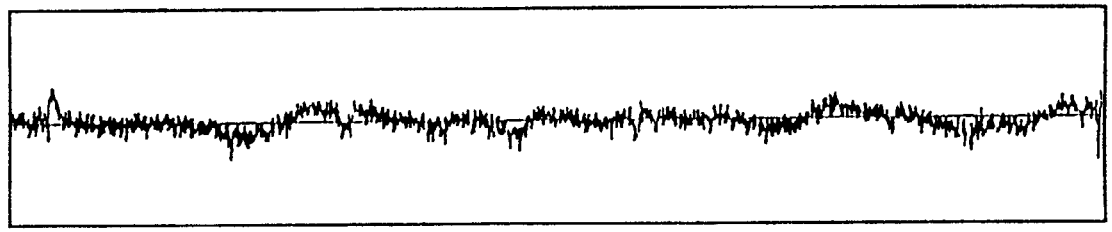
FIG. 3      Ra 7.6 μ in
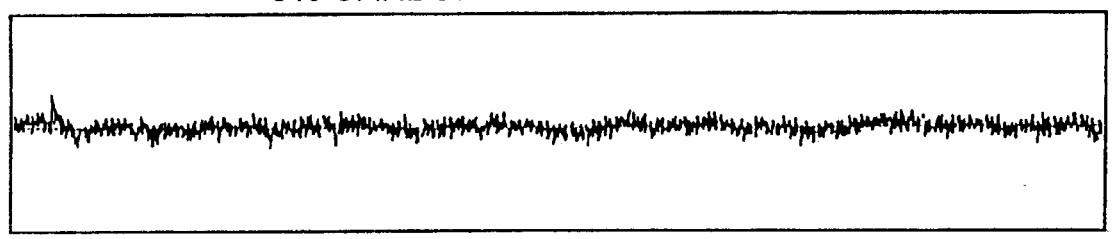
FIG. 4      Ra 6.0 μ in

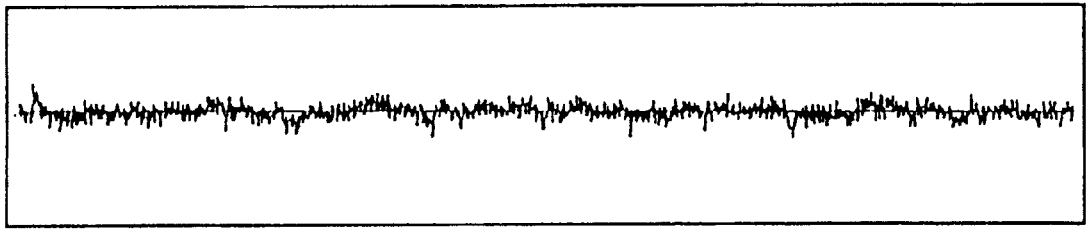
FIG. 5     Ra 5.6 μ in
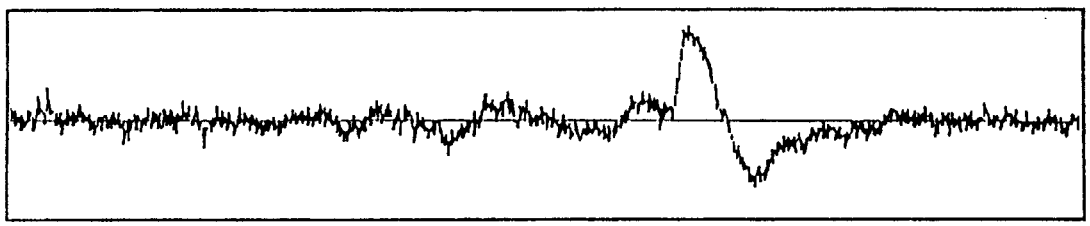
FIG. 6     Ra 11.5μ in
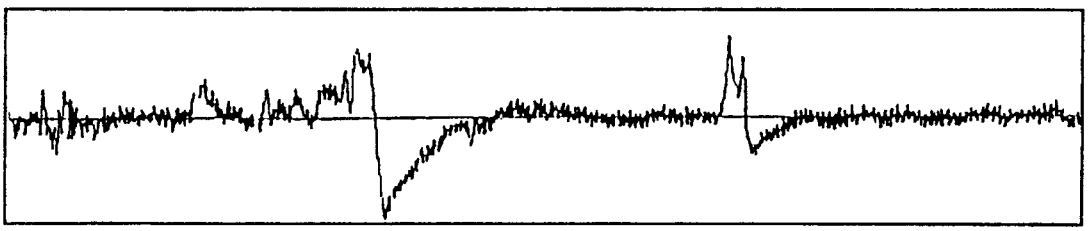
FIG. 7     Ra 11.7μ in

FIBROUS LINING MATERIAL COMPRISING A PRIMARY LAYER HAVING LESS FIBRILLATED ARAMID FIBERS, CARBON FIBERS, CARBON PARTICLES AND A SECONDARY LAYER COMPRISING CARBON PARTICLES

TECHNICAL FIELD

This is a continuation-in-part of Ser. No. 08/704,899 filed Aug. 30, 1996, which is a continuation of Ser. No. 08/534,978 filed Sep. 28, 1995, abandoned, which is a continuation-in-part of Ser. No. 08/253,727 filed Jun. 3, 1994, now U.S. Pat. No. 5,753,356, which is a continuation-in-part of Ser. No. 08/101,951 filed Aug. 4, 1993, abandoned, all of which are expressly incorporated herein by reference.

The present invention relates to a non-asbestos, non-metallic friction material comprising a fibrous base material having carbon particles deposited on the surface of the fibrous base material during the friction paper making process. The fibrous base material comprises a primary layer having less fibrillated aramid fibers, carbon fibers, carbon particles, phenolic novoloid fibers, cotton fibers and at least one filler material, such as diatomaceous earth; and, a secondary layer comprising carbon particles. The invention further relates to a composite friction material comprising the above described fibrous base material impregnated with a phenolic resin or a modified phenolic resin blend. In certain embodiments, at least one silicone resin is blended with at least one phenolic resin for use in impregnating the fibrous base material.

The friction material of the present invention has improved strength, porosity, wear resistance and noise resistance. The friction material of the present invention has better "break-in" behavior and more stable coefficients of friction in the initial stages than conventional friction materials. Also, the resulting friction material is especially useful in high energy applications and noise-free conditions.

The friction material of the present invention also has an extended high speed durability life.

BACKGROUND ART

New and advanced transmission systems and braking systems are being developed by the automotive industry. These new systems often involve high energy requirements. Therefore, the friction materials technology must be also developed to meet the increasing energy requirements of these advanced systems.

The friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced transmission and braking systems. Not only must the friction material remain stable at high temperatures, it must also be able to rapidly dissipate the high heat that is being generated during operating conditions.

The high speeds generated during engagement and disengagement of the new transmission and braking systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. In particular, the friction material must not shudder during the initial cycles or "break-in" period of operation.

It is also important that the friction material have a desired torque curve shape so that, during frictional engagement, the friction material is noise or "squawk" free.

Previously, asbestos fibers were included in the friction material for temperature stability. For example, the Arledter et al. U.S. Pat. No. 3,270,846 patent describes phenolic and phenolic-modified resins used with asbestos. Now, however, due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

While phenolic resins have found use in friction materials for wet clutch applications, the phenolic resins have various limitations. The phenolic resin friction materials do not have the high heat resistance necessary for use with the new high energy transmission systems. In particular, the phenolic resins carbonize at a temperature of about 450° to 500° C. which is too low to be useful in high energy applications. In addition, phenolic resins are rigid materials and when the phenolic resins are used in a friction material, uneven lining wear and separator plate "hot spots" result.

Attempts to overcome the limitations and drawbacks of phenolic resin friction materials include the replacement of phenolic resins with other thermosetting resins. One attempt to produce friction materials involves the modification of a phenolic resin with various synthetic resins. One example, described in Takarada et al. U.S. Pat. No. 4,657,951, is a phenolic resin modified with an organopolysiloxane which is compression molded to form a friction material. The phenolic resin and organopolysiloxane are reacted together to effect a condensation reaction which is then distilled, solidified by cooling, and pulverized to obtain a powdered phenolic-modified resin. The powdered phenolic-modified resin was used in forming a compression molded friction material.

As far as is known, there is no disclosure of a friction material for use in transmission systems which includes a silicone material blended with a phenolic material and used to impregnate a friction paper.

While the Hartmann et al. U.S. Pat. No. 3,911,045 reference discusses a silicone material blended with phenolic resins for use as a compression molding composition, there is no disclosure or suggestion that a silicone material could successfully be blended with a resin material and used to impregnate a friction lining material. On the contrary, previous attempts to use silicone resins in friction materials have been unacceptable. A friction lining that is impregnated or saturated with a silicone resin has, in the past, demonstrated poor shear strength and delamination resistance. Further, friction materials saturated with a silicone resin are usually too elastic and therefore tests with undesirable friction and wear characteristics resulting. It is not surprising that molded friction lining compositions formed entirely of a phenol-formaldehyde resin-polysiloxane resin have not been used even though they are known, since such molded compositions do not have the necessary constant coefficient of friction characteristics and such friction materials fail under high energy and high heat conditions.

The present invention is an improvement over the Seitz, U.S. Pat. No. 5,083,650 reference which involves a multi-step impregnating and curing process; i.e., a paper is impregnated with a coating composition, carbon particles are placed on the paper, the coating composition in the paper is partially cured, a second coating composition is applied to the partially cured paper, and finally both coating compositions are cured.

In order for friction materials to be useful in "wet" applications, the friction material must have a wide variety of acceptable characteristics. The friction material must be resilient or elastic yet resistant to compression set, abrasion and stress; have high heat resistance and be able to dissipate heat quickly; and, have long lasting, stable and consistent frictional performance. If any of these characteristics are not met, optimum performance of the friction material is not met.

Thus, it is also important that the impregnating resin be used with a suitable friction lining or fibrous base material to form a high energy application friction material. The friction material must have good shear strength both when saturated with the wet resin during impregnation and when saturated with brake fluid or transmission oil during use.

It is also important, under certain applications, that the friction material have high porosity such that there is a high fluid permeation capacity during use. Thus, it is important that the friction material not only be porous, it must also be compressible. The fluids permeated into the friction material must be capable of being squeezed or released from the friction material quickly under the pressures applied during operation of the brake or transmission, yet the lining material must not collapse. It is also important that the friction material have high thermal conductivity to also help rapidly dissipate the heat generated during operation of the brake or transmission.

As far as it is known, there is no disclosure of a friction material for use in transmission systems which includes an aramid type fiber which is less fibrillated than currently available aramid fibers in combination with carbon fibers, carbon particles and cotton fibers as a primary layer and having a secondary layer of carbon particles on the primary layer.

Accordingly, it is an object of the present invention to provide an improved friction material with reliable and improved properties compared to those of the prior art.

A further object of this invention is to provide friction materials with good anti-shudder performance, high speed and energy durability, high porosity strength, and noise resistance.

As a result of extensive research in view of the need for a better friction material, a friction material with improved characteristics has been developed by the inventors. The present friction material is especially useful in applications where the friction material is subjected to harsh "break-in" conditions during use.

DISCLOSURE OF THE INVENTION

In order to achieve the requirements discussed above, many materials were evaluated for friction and heat resistant characteristics under conditions similar to those encountered during operation. Both commercially available brake linings and transmission materials were investigated and proved not to be suitable for use in high energy applications.

The present invention is especially useful in brakes and in clutch applications. The present invention provides a fibrous base material comprising a porous primary layer and secondary layer. The porous primary layer comprises less fibrillated aramid fibers, carbon fibers, carbon particles, cotton fibers, at least one filler material, and optionally other ingredients. The less fibrillated aramid fibers create a porous fibrous base material. The carbon fibers provide the friction material with good heat conduction such that the friction material has a desired heat resistance. The carbon particles also provide good heat conduction and additionally provide the friction material with good friction characteristics such that the friction material has a good or smooth "feel" in shifting and has an essentially noise or squawk-free operation of the brakes and clutches. The presence of the cotton fibers provides the friction material with desired "break-in" characteristics such that there is little or no shudder which occurs during the initial use of the friction material.

The secondary layer of the fibrous base material comprises an optimum amount of carbon particles deposited on the porous primary layer during the process for making the fibrous base material. In certain preferred embodiments, a suitable retention aid can be used to improve the adhesion of the carbon particles on the porous primary layer.

The fibrous base material can be impregnated using different resin systems. In certain embodiments, it is useful to impregnate the fibrous based material with a phenolic resin or a modified phenolic-based resin. It has now been discovered that, in certain embodiments, when a silicone resin is blended or mixed with a phenolic resin in compatible solvents and that silicone-phenolic resin blend is used to impregnate a fibrous base material of the present invention, a high energy friction material is formed. Such high energy friction material has high friction stability and high heat resistance.

The friction material of the present invention prevents uneven lining wear and therefore the formation of separator plate "hot spots" from developing during the useful life of the friction material. When there is little uneven wear on the friction material, there is more likelihood to maintain "steady state" of the clutch or brake components and therefore, more consistent performance of the clutch and brake. Further, the friction material of the present invention shows good shear strength such that the friction material resists delamination during use.

BRIEF DESCRIPTION OF DRAWINGS

FIG. 2 is a new separator plate profile having no carbon as a secondary layer.

FIG. 3 is a separator plate surface profile for Example D having no carbon as a secondary layer.

FIG. 4 is a separator plate surface profile for Example E having a secondary layer comprising about 5% carbon.

FIG. 5 is a separator plate surface profile for Example F having a secondary layer comprising about 10% carbon material.

FIG. 6 is a separator plate surface profile for Example G having a secondary layer comprising about 15% carbon material.

FIG. 7 is a separator plate surface profile for Example H having a secondary layer comprising about 20% carbon material.

BEST MODE OF CARRYING OUT THE INVENTION

Figure 1:
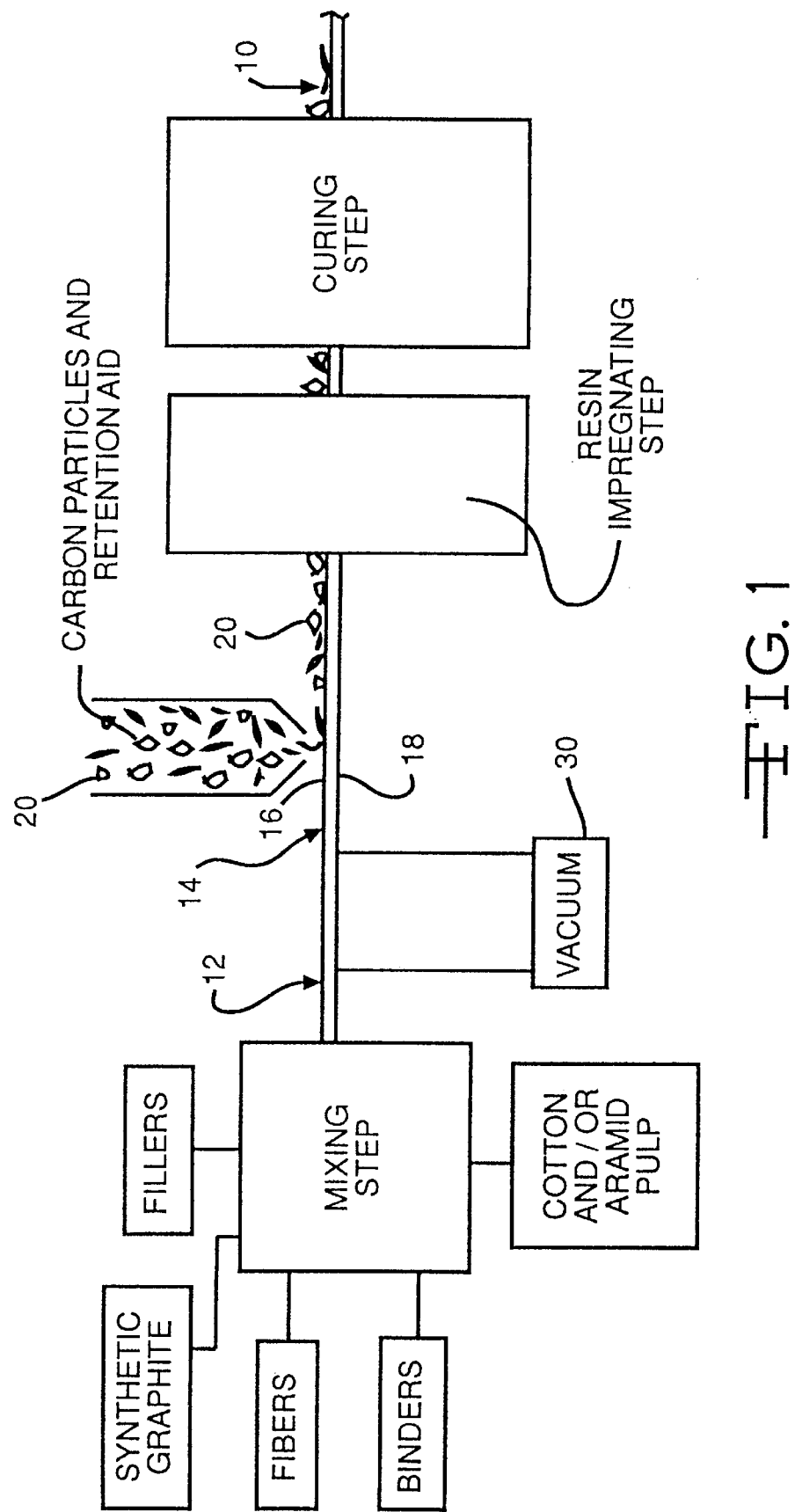
FIG. 1 is a schematic diagram showing one method for making a friction material according to the present invention.

Various resins useful in the present invention include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that the target pick up of resin by the friction material range from about 40 to about 65%, and, in certain embodiments, about 60 to at least 65%, by weight, total silicone-phenolic resin. After the fibrous base material is impregnated with the resin, the fibrous base material is cured for a period of time (in certain embodiments for about ½ hour) at temperatures ranging between 300–400° C. to cure the resin binder in the friction material. The final thickness of the friction material depends on the initial thickness of the fibrous base material and, in certain embodiments, preferably ranges from about 0.014" to about 0.040".

It further contemplated that other ingredients and processing aids known to be useful in both preparing resin blends and in preparing impregnating fibrous-based materials can be included in the friction materials.

For the embodiments where a phenolic resin and silicone resin are used, no new compound is formed when the silicone resin and phenolic resin are blended together. The chart below shows the prominent FT-IR peaks in wave numbers for a cured silicone resin, a cured phenolic resin, and about 50/50 blend of silicone resin and phenolic resin which has been cured. As can be seen, no new peaks occur in the 50/50 silicone-phenolic blend, and the peaks that are present reflect the presence of both the silicone resin and the phenolic resin. Thus, it is shown that the resins cure separately and that no new compound is formed.

| PROMINENT FT-IR PEAKS IN WAVENUMBERS | | |
|---|---|---|
| SILICONE RESIN | PHENOLIC RESIN | 50/50 BLEND |
| — | 3364 | 3366 |
| 2966 | — | 2964 |
| — | 1510 | 1510 |
| — | 1479 | 1481 |
| 1412 | — | 1410 |
| 1271 | — | 1261 |

-continued

| PROMINENT FT-IR PEAKS IN WAVENUMBERS | | |
|---|---|---|
| SILICONE RESIN | PHENOLIC RESIN | 50/50 BLEND |
| 798 | — | 800 |
| 767 | — | 769 |

Both the silicone resin and the phenolic resin are present in solvents which are compatible to each other. These resins are mixed together (in preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

Therefore, according to one aspect of the present invention, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. According to the present invention, the presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

The greater elasticity allows for more uniform heat dissipation during use of the friction material since the fluid in the transmission or brake can rapidly move through the porous structure. Further, the increased elasticity provides more uniform pressure or even pressure distribution on the friction material such that uneven lining wear or separator plate "hot spots" are eliminated.

The friction material of the present invention has high durability and high delamination resistance. The shear strength (psi) for the friction material of the present invention is greater than for the conventional materials. The use of the less fibrillated fibers and the resulting pore structure of the friction material provides increased thermal resistance to the friction material. The fiber geometry not only provides increased thermal resistance, but also provides delamination resistance and squeal resistance. The presence of the carbon fibers and carbon particles and at least one filler material aids in increasing the thermal resistance, maintaining a steady coefficient of friction, and increasing the squeal resistance.

Various methods for impregnating materials can be practiced with the present invention. The fibrous base material is impregnated with the phenolic or modified phenolic resin, preferably so that the impregnating resin material comprises about 45 to about 65 parts, by weight, per 100 parts, by weight, of the friction material. After the fibrous base material has been impregnated with the resin, the impregnated fibrous base material is heated to a desired temperature for a predetermined length of time to form the friction material. The heating cures the phenolic resin at a temperature of about 300° F. When other resins are present, such as a silicone resin, the heating cures the silicone resin at a temperature of about 400° F. Thereafter, the impregnated and cured friction material is adhered to the desired substrate by suitable means.

Another aspect of the present invention relates to a porous primary layer of the fibrous base material which comprises less fibrillated aramid fibers, carbon particles, carbon fibers and at least one filler material, and in certain embodiments cotton fibers, which are combined to form a paper-like fibrous base material. It is to be understood that various methods of forming fibrous base materials are contemplated as being useful in preparing the fibrous base material of the present invention. It has been found by the inventors herein that the use of less fibrillated aramid fibers and carbon fibers in a primary layer of the fibrous base material improves the friction material's ability to withstand high temperatures. It has also been found by the inventors herein that, in certain embodiments, a relatively low amount of cotton fibers in the primary layer improves the friction material's clutch "break-in" characteristics.

The present invention provides a friction material comprising less fibrillated aramid fibers which generally have few fibrils attached to a core fiber. The use of the less fibrillated aramid fibers provides a friction material having a more porous structure; i.e., there are more and larger pores than if a typical fibrillated aramid fiber is used. The porous structure is generally defined by the pore size and liquid permeability. In a preferred embodiment, the fibrous base material defines pores ranging in mean average size from about 2.0 to about 15 microns in diameter.

In certain embodiments, the mean pore size ranges from about 2.5 to about 4 microns in diameter and the friction material has readily available air voids of at least about 50% and in certain embodiments at least about 60% or higher.

The higher mean flow pore diameter and Darcy's permeability indicate that the friction material is more likely to run cooler or with less heat generated in a transmission due to better automatic transmission fluid flow of material throughout the porous structure of the friction material. During operation of a transmission system, oil deposits on the surface of a friction material tend to develop over time due to a breakdown of the automatic transmission fluid, especially at high temperatures. The oil deposits on the fibers decrease the pore openings. Therefore, when a friction material initially starts with larger pores, there are more open pores remaining during the useful life of the friction material. In addition, in embodiments impregnated with a silicone resin, the silicone resin, due its elastic characteristics, allows the fibers in the friction lining to have a more open structure.

The length of the less fibrillated fiber ranges from about 0.5 to about 6 mm and has a Canadian Standard Freeness (CSF) of greater than about 450 and in certain embodiments, about 500 to about 550 and in other certain embodiments, about 580–640 and most preferably about 620–640. In contrast, more fibrillated fibers, such as aramid pulp, have a freeness of about 285–290.

The "Canadian Standard Freeness" (T227 om-85) means that the degree of fibrillation of fibers can be described as the measurement of freeness of the fibers. The CSF test is an empirical procedure which gives an arbitrary measure of the rate at which suspension of three grams of fibers in one liter of water may be drained. Therefore, the less fibrillated aramid fibers have higher freeness or higher rate of drainage of fluid from the friction material than other aramid fibers or pulp. It has now been surprisingly found that friction materials comprising the aramid fibers having a CSF ranging from about 530–650, preferably about 580–640, and most preferably about 620–640, provide superior friction performance and have better material properties than friction materials containing conventionally more fibrillated aramid fibers. It has surprisingly been found that the longer fiber length, together with the high Canadian freeness, provide a friction material with high strength, high porosity and good wear resistance. As shown in the examples below, high energy tests conducted with materials containing, for example, the less fibrillated aramid fibers (CSF about 580–640 and most preferably about 620–640), have good long-term durability and stable coefficients of friction.

The more porous the structure of the friction material, the more efficient is the heat dissipation. The oil flow in and out of the friction material during engagement of the friction material during use occurs more rapidly when the friction material is porous.

It has further been discovered that the less fibrillated fibers, carbon fibers, carbon particles, and filler improve the pore structure of the fibrous base material so that there are more porous openings throughout the fibrous base material. The increased porosity also increases the elasticity of the friction material. A lower degree of fibrillation of the less fibrillated aramid fibers results in a friction material having a more porous structure.

It has not been known until the present invention to include carbon fibers and carbon particles in a primary layer of a fibrous base material comprising less fibrillated aramid fibers. The use of carbon particles and carbon fibers in the fibrous base material provides a more three dimensional structure to the fibrous base material. In certain embodiments, it is preferred that the size and geometry of the carbon particles be in the about 20 to about 50 micron size range. In these certain embodiments, it has been discovered that if the carbon particle size is too large or too small, there is not the optimum three-dimensional structure and consequently the heat resistance is not as optimum.

The primary layer also includes novoloid fibers which comprise a cross-linked phenol-formaldehyde polymer. In certain embodiments, it has been found that a combination of novoloid fibers wherein one fiber type has a relatively shorter length with an average length of about 0.2 mm and another fiber type has a relatively longer length with an average length of about 3 mm is especially useful. While not wishing to be held to any one theory, it is believed that the relatively shorter fibers act more like particles than like fibers and therefore act like a binder type material in the friction material. The shorter particle-like novoloid fibers provide an improved strength to the friction paper. The relatively longer fibers, provides strength and structure to the friction material by preventing collapse of the friction material when the friction material is under pressure. While not wishing to be held to any particular theory, it is believed that the novoloid fibers, which are chemically similar to the phenolic resins which are present in the friction material, bond to the phenolic resin material to help provide both mechanical and chemical strength to the friction material. In various embodiments, the novoloid fibers can be present in the range of about 1 to about 10%, and preferably about 2%.

The use of carbon particles and carbon fibers in the primary layer of the fibrous base material provides an oriented or three-dimensional structure to the fibrous base material. The carbon particles and carbon fibers have a high thermal conductivity which, in turn, provides the friction material with the ability to dissipate heat rapidly.

The primary layer of the fibrous base material can include carbon particles which have high thermal conductivity. The carbon particles provide the friction material with good heat conduction such that the friction material has desired heat resistance. The carbon particles also provides the friction material with good friction characteristics such as a good or smooth "feel" in shift and essentially noise or "squawk" free operation of the brakes and clutches. The carbon particles are less structured and more randomly structured than graphite. particles and are typically made by processing various substrates at relatively lower temperatures (e.g., 1000° C.).

It is to be understood that various fillers are useful in the primary layer of the fibrous base material of the present invention. In particular, silica fillers such as diatomaceous earth (celite) and/or silica are especially useful. The celite is an inexpensive organic filler which bonds strongly to the fibrous materials. The strong bonds provide high mechanical strength to the friction material. The celite also provides high coefficients of friction to the friction material. The celite also provides the friction material with a smooth friction surface and provides a good "shift feel" and friction characteristics to the friction material. However, it is contemplated that other types of fillers are suitable for use in the present invention and the choice of filler depends upon the particular end use requirements of the two-ply friction material.

In certain embodiments, cotton fibers are added to the primary layer of the fibrous base material of the present invention to give the fibrous material higher coefficients of friction. In certain embodiments, about 3 to about 10%, and in certain embodiments about 5% can be included in the primary layer of the fibrous base material.

One example of a formulation for a primary layer of a fibrous base material comprises about 10 to about 50%, by weight, of less fibrillated aramid fiber about 5 to about 20%, by weight, of carbon particles; about 5 to about 25% carbon fibers; about 15 to about 35%, by weight, filler material; about 0 to about 10% cotton fibers; and, about 0.5 to about 5% phenolic novoloid fibers. In certain embodiments, one particular formulation of the primary layer which has found to be useful comprises about 40%, by weight, less fibrillated aramid fibers; about 13%, by weight, carbon particles; about 20% carbon fibers; about 20%, by weight, filler; about 3 to about 5% cotton fibers, and about 2% phenolic novoloid fibers. Another particularly useful formulation of the primary layer comprises about 43%, by weight, less fibrillated aramid fibers; about 15%, by weight, carbon particles; about 20%, by weight carbon fibers; about 20%, by weight, filler; and about 2% phenolic novoloid fibers.

The formulation further comprises a secondary layer comprised of a deposit of carbon particles on the surface of the fibrous material during the fibrous base material making process. The adhesion of the carbon particles on the surface of the fibrous base material can be improved by using retention aids and/or binding agents such as a suitable amount of latex type materials present in the primary or lower layer.

In preferred embodiments, the amount of carbon particles present in the secondary layer ranges from about 0.2 to about 20%, by weight, and in certain embodiments about 15 to about 5%, by weight, and in other embodiments about 2 to about 20%, by weight, of the friction paper. In preferred embodiments, the area of coverage of carbon particles on the primary layer surface is in the range of the about 3 to about 90% of the surface area. One particular formulation of the secondary layer comprises about 3 to about 5% by wt., carbon particles, based on the weight of the fibrous base material.

The uniformity of the layer of carbon particles on the surface of fibrous base materials can also be improved using a range and size of the carbon particles that is preferably from about 0.5 to about 80 μm. However, it is contemplated that other sizes of carbon particles are also useful as a secondary layer on the fibrous base material of the present invention.

The following examples provide further evidence that the fibrous base material and friction material of the present invention are an improvement over the conventional friction materials. Various preferred embodiments of the invention are described in the following examples, which however, are not intended to limit the scope of the invention.

The coefficient of friction remains for the friction material of the present invention relatively steady as the cycles increase, thus showing the high friction stability of the friction material. Also, the mid point dynamic coefficient of friction for the friction materials show that as the number of cycles increased, the mid point coefficient of friction remained relatively steady. The friction materials of the present invention have more stable mid point coefficients of friction than comparative friction materials.

The torque curve shape indicates that the friction material of the present invention is especially useful in high speed, high energy and high temperature applications. The stable torque curve also shows that the friction material of the present invention is essentially noise or squawk-free.

The friction material of the present invention performs consistently better than the comparative materials. Thus, the fibrous base materials of the present invention perform much better at higher speeds than the comparative materials. It is also important to note that there is no fall off of coefficient of friction as the number of cycles increases for the fibrous base materials of the present invention. Also, the relatively steady coefficient of friction indicates the friction materials are very stable.

In particular, the friction material of the present invention performs consistently better than conventional high energy materials in extended high speed durability tests. An increase in Canadian Standard Freeness of aramid type fibers produces fibrous base materials having improved durability. Further, fibrous base materials containing aramid fibers having a CSF of at least about 580–640, and preferably about 600–640 and most preferably about 620–640, have larger pore sizes than other types of aramid fibers. The high inertia durability of the fibrous base materials having such less fibrillated aramid fibers is improved and there is a better fade resistance.

One preferred embodiment for making a friction material 10 is shown in FIG. 1. A fibrous base material 12 comprises a lower layer 14 having an upper or top surface 16 and a lower or bottom surface 18. In a preferred embodiment the lower layer 14 comprises the less fibrillated aramid fiber, carbon particles, carbon fibers, cotton fibers, filler material, and phenolic novoloid fibers. While the lower layer 14 is wet, carbon particles 20 are deposited onto the top surface 16 of the wet lower layer 14. In certain embodiments, the lower layer 14 further comprises a suitable amount of at least one type of binder or retention aid material such that the carbon particles are adhered to the wet layer 14 by the retention aid material which is present in the lower wet layer 14. Suitable retention aid materials include, for example a latex type binder material and/or an alum based material having a pH of about 4.5 or less.

In another embodiment it is also useful to use a low vacuum pressure means 30 on a lower side of the wet layer 14 prior to deposition of the carbon particles 20 on the opposing bottom surface 18 of the layer 14.

A preferred process for producing the non-asbestos friction material comprises mixing less fibrillated aramid fibers, carbon particles, carbon fibers, cotton fibers, phenolic novoloid fibers, and at least one filler to form a primary layer fibrous base material. At least one surface of the fibrous base material is coated with a secondary layer comprising the carbon particles. The fibrous base material with the coat carbon particles thereon is impregnated with at least one phenolic or modified phenolic resin. The impregnated, carbon coated fibrous base material is cured at a predetermined temperature for a predetermined period of time.

In another embodiment a phenolic resin can be mixed with a silicone resin to impregnate the fibrous base material, as disclosed in U.S. Pat. No. 5,639,804, the entire contents of which are expressly incorporated by reference herein.

It has been found that the longer fiber length, together with the high Canadian freeness and layer of carbon particles provides a friction material which provides high durability, good wear resistance and improved break-in characteristics. The change in the coefficient of friction of the carbon deposit layered friction material in the initial stages is much less than friction materials with no carbon deposit.

Table 1 provides a summary of test procedure conditions for break-in characteristics test 5004DN, high speed durability tests 5004CN, high energy durability tests 5030CN and the μv-p-t characteristic test 491N–494N for the materials shown in Examples 1–4 below.

TABLE 1

Test Procedure Conditions (Not Immersed Modification) (Size 3 Plates)

| Test Procedure | Break-in Characteristics 5004DN | High Energy Durability Test 5004CN | High Energy Durability Test 5030CN |
|---|---|---|---|
| Level | Level A | Level A & C | Level A & C |
| Cycles | 200 cycles | 50 cycles | ← |
| Speed | 3700 rpm | ← | 3600 rpm |
| Inertia | 2.17 kgcmsec² | ← | ← |
| Pressure | 137.8 KPa | ← | ← |
| Temperature | 100–110° C. | ← | ← |
| Oil flow | 0.757 lpm | ← | ← |
| Kinetic energy | 15974 Joule | ← | 15122 Joule |
| Level | — | Level B | Level B |
| Cycles | — | 5000 cycles | 5000 cycles |
| Speed | — | 6200 rpm | 4000 rpm |
| Inertia | — | 1.98 kgcmsec² | 5.30 kgcmsec² |
| Pressure | — | — | — |
| Stop Time | — | *0.8 sec. | **0.95 sec. |
| Temperature | — | 110–110° C. | 100–110° C. |

TABLE 1-continued

Test Procedure Conditions (Not Immersed Modification)
(Size 3 Plates)

| | | | |
|---|---|---|---|
| Oil flow | — | 0.787 lpm | ← |
| Kinetic energy | — | 40865 Joule | 45558 Joule |
| Power density | — | 2.27 W/mm$^2$ | 2.13 W/mm$^2$ |

$\mu$-v-p-t Characteristics

| Test Procedures | | 491N–494N | |
|---|---|---|---|
| Level | Level A | Level B | |
| Cycles | 50 cycles | 25 cycles | |
| Speed | 800 rpm | 1400 rpm | |
| Inertia | 3.55 kgcmsec$^2$ | ← | |
| Pressure | 48.7 KPa | 97.4 KPa | |
| Temperature | 491N = 30° C., 492N = 80° C. | ← | |
| | 493N = 100° C., 494N = 120° C. | ← | |
| Oil flow | 0.757 lpm | ← | |
| Kinetic energy | 1223 Joule | 3745 Joule | |
| Level | Level C | Level D | |
| Cycles | 25 cycles | 25 cycles | |
| Speed | 2600 rpm | 3600 rpm | |
| Inertia | 3.55 kgcmsec$^2$ | 3.55 kgcmsec$^2$ | |
| Pressure | 194.8 KPa | 292.2 KPa | |
| Stop Time | — | — | |
| Temperature | 491N = 30° C., 492N = 80° C. | 491N = 30° C., 492N = 80° C. | |
| | 493N = 100° C., 494N = 120 ° C. | 493N = 100° C., 494N = 120° C. | |
| Oil flow | 0.787 lpm | ← | |
| Kinetic energy | 12916 Joule | 24761 Joule | |
| Power density | — | — | |

Note:
*In level B, adjust apply pressure to maintain 0.8 seconds stop time within 175th cycles.
**In level B, press start at 140 KPa, adjust the pressure to maintain 0.95 seconds stop time by 175th cycles.

EXAMPLE 1

The following fibrous base materials, in percent, by weight, are used in the examples below.

Example A is a two layer fibrous base material comprising a primary layer of about 45% fibrillated aramid fibers (CSF about 450–500), about 10% synthetic graphite, about 40% diatomaceous earth, and optionally about 5% optional filler, such as aramid pulp, and a secondary layer of about 3–5% carbon particles. In certain embodiments, it is desirable to use a retention aid to help adhere the carbon particles on the surface of the fibrous base material.

Example B is a two layer fibrous base material comprising a primary layer of about 45% fibrillated aramid fibers (CSF about 450–500), about 23% synthetic graphite, about 27% diatomaceous earth, and optionally about 5% optionally filler such as aramid pulp, and a second layer of about 3–5% carbon particles.

Example C is a two layer fibrous base material comprising a primary layer of about 25% less fibrillated aramid fibers (CSF about 450–500), about 45% carbon particles and about 30% cotton fibers, and a secondary layer of about 20% carbon particles. In certain embodiments, it is desirable to use a retention aid up to about 20% Alum to a pH4.5 to help adhere the carbon particles on the surface of the fibrous base material.

Table 2 below shows results of a break-in test using a phenolic resin, for each of th, fibrous base materials shown in Examples A, B and C and the percent resin pick-up for each fibrous base material is as shown.

Table 3 below shows the break-in characteristics for the fibrous base materials for Examples A, B and C saturated with a silicone resin, wherein each fibrous base material has a percent resin pick-up as shown.

TABLE 2

| | Break-In Test | | |
|---|---|---|---|
| Pick-Up | 39% | 40% | 41% |
| $\mu$(mid) | Ex. A | Ex. B | Ex. C |
| cycle 1 | 0.107 | 0.101 | 0.132 |
| cycle 50 | 0.12 | 0.12 | 0.122 |
| cycle 100 | 0.121 | 0.12 | 0.116 |
| cycle 200 | 0.126 | 0.128 | 0.119 |
| % change | 17.76 | 26.73 | −9.85 |

TABLE 3

| | Break-In Test | | |
|---|---|---|---|
| Raw Paper | Ex. A | Ex. B | Ex. C |
| Pick-Up | 61% | 60% | 65% |
| Cure Condition | silicone resin | silicone resin | silicone resin |
| $\mu$(mid) | | | |
| cycle 1 | 0.156 | 0.146 | 0.144 |
| cycle 50 | 0.162 | 0.154 | 0.137 |
| cycle 100 | 0.157 | 0.157 | 0.145 |
| cycle 200 | 0.162 | 0.153 | 0.142 |
| % change | 3.85 | 4.79 | −1.39 |
| Stop time | | | |
| cycle 1 | 0.79 | 0.821 | 0.808 |
| cycle 50 | 0.738 | 0.752 | 0.826 |
| cycle 100 | 0.745 | 0.748 | 0.816 |
| cycle 200 | 0.749 | 0.748 | 0.807 |
| % change | −5.19 | −8.89 | −0.12 |

It is noted that for the high carbon particles deposit fibrous base materials (Example C) saturated with phenolic resin and non-phenolic resin, the dynamic coefficient of friction value and the stop time did not change after the 200 cycles test.

For papers with the low percentage of carbon particle content on the fibrous base material (Examples A and B), the silicone resins help stabilize the dynamic coefficient of friction values within 20 cycles. In data not shown, it took 60 cycles for a phenolic/silicone resin to stabilize and about 80 cycles for a phenolic resin and 100 cycles for the phenolic resin system to stabilize.

The stop time became constant after 20 cycles for the pure silicone resins, while it took 80 cycles to reach the constant stop time for the silicone blend (data not shown). The phenolic resin examples shown in Table 1 needed about 100 cycles to level of stop time.

In certain embodiments, the break-in behavior depends on the degree of carbon coverage on the surface of the fibrous base material and on the compositions of the primary layer formulation (in various embodiments, sometimes the resin type is also to be considered in controlling the break-in behavior).

EXAMPLE 2

The following fibrous base materials, in percent by weight, are used in the examples below. Each example comprises about 20% less fibrillated aramid fibers (CSF about 580–640), about 20% synthetic graphite, about 20% diatomaceous earth, about 35% cotton fibers, and optionally about 2% latex. A secondary layer for each of the following examples comprised various percentage by weight of carbon particles.

Example D—0% carbon particles;
Example E—5% carbon particles;
Example F—10% carbon particles;
Example G—15% particles; and
Example H—20% carbon particles.

Table 4 provides break-in test data for Examples D, E, F, G and H saturated with a phenolic resin and cured at 350° F. for 30 minutes. The coefficient of friction for the mid, initial, final coefficients of friction are shown. Also, the stop time is shown. Table 4 also shows the surface carbon coverage as percent of area and the saturated paper pore size and liquid permeability. The higher mean flow pore diameter indicates that the friction material is more likely to have lower interface temperature because of more efficient dissipation in their transmission due to better automatic transmission fluid flow of materials out the porous structure of the friction material. Therefore, when a friction material initially starts with larger pores, more open pores remain during the useful life of the friction material.

filler material aids in increasing the thermal resistance, maintaining a steady coefficient of friction and increasing the squeal resistance. In addition, the average pore size for the friction material of the present invention ranges from about 0.5 $\mu$m to about 120 $\mu$m in diameter and in certain embodiments about 6 $\mu$m to about 50 $\mu$m in a preferred embodiment.

Table 5 also shows the compression/relaxation studies. These tests report the effect on paper caliber caused by repeatedly pressing on a sample and releasing the sample through a series of different pressures. These readings provide an indication of the internal resistance to set or compacting during the processing. The examples show good elasticity which allows for more uniform heat dissipation during use of the friction materials, since the fluid in the transmission or brake can rapidly move through the porous structure. Further, the increase elasticity provides more uniform pressure or even pressure distribution on the friction material, such that uneven lining wear or separator plate "hot spots" are eliminated or minimized.

TABLE 4

Break-In Test
(Procedure 5004D)

| Coverage (% By Weight) Resin Cure Condition | Ex. D 0%, phenolic 350° F./30 min | Ex. E 5%, phenolic 350° F./30 min | Ex. F 10%, phenolic 350° F./30 min | Ex. G 15%, phenolic 350° F./30 min | Ex. H 20%, phenolic 350° F./30 min |
|---|---|---|---|---|---|
| $\mu$(mid) | | | | | |
| cycle 1 | 0.108 | 0.122 | 0.125 | 0.130 | 0.129 |
| cycle 50 | 0.121 | 0.124 | 0.118 | 0.119 | 0.109 |
| cycle 200 | 0.127 | 0.127 | 0.125 | 0.125 | 0.110 |
| % change | 17.6 | 4.1 | 0.0 | −3.8 | −14.7 |
| $\mu$(initial) | | | | | |
| cycle 1 | 0.130 | 0.140 | 0.143 | 0.137 | 0.144 |
| cycle 50 | 0.153 | 0.140 | 0.133 | 0.131 | 0.128 |
| cycle 200 | 0.154 | 0.145 | 0.149 | 0.138 | 0.122 |
| % change | 18.5 | 3.6 | 4.2 | 0.7 | −15.3 |
| $\mu$(final) | | | | | |
| cycle 1 | 0.109 | 0.124 | 0.130 | 0.130 | 0.133 |
| cycle 50 | 0.122 | 0.127 | 0.123 | 0.122 | 0.118 |
| cycle 200 | 0.133 | 0.130 | 0.123 | 0.129 | 0.114 |
| % change | 22.0 | 4.8 | −5.4 | −0.8 | −14.3 |
| stop time | | | | | |
| cycle 1 | 1.078 | 0.963 | 0.954 | 0.939 | 0.925 |
| cycle 50 | 0.903 | 0.889 | 0.911 | 0.917 | 0.956 |
| cycle 200 | 0.861 | 0.863 | 0.899 | 0.898 | 0.962 |
| % change | −20.1 | −10.4 | −5.8 | −4.4 | 4.0 |
| Sat. paper pore size ($\mu$m) | 8.31 | 6.13 | 7.10 | 7.16 | 7.72 |
| Liquid permeability(cm$^2$) | 0.127 | 0.111 | | 0.085 | 0.080 |
| Surface carbon coverage(area %) | 2.0% | 25.0% | 35.0% | 49.0% | 90.0% |

Table 5 shows the shear strength for Examples E, F, G and H. The higher the shear strength, the better the mechanical strength the friction material has, which means that more pressure is needed to shear the friction lining.

The shear strength friction materials of the present invention are greater than those for conventional materials. The use of the less fibrillated fibers and the resulting porous structure of the friction material provides increased thermal resistance of the friction material. The fiber geometry not only increases thermal resistance, but also provides delamination resistance and squeal resistance. In addition, the presence of the synthetic graphite particles and at least one

TABLE 5

| | 2 Ply Carbon Materials | | | | |
|---|---|---|---|---|---|
| Trial # | Ex. D | Ex. E | Ex. F | Ex. G | Ex. H |
| Shear psi | 357 | 351 | 292 | 337 | 199 |
| Comp-set | 0.067/0.013 | 0.068/0.014 | 0.078/0.011 | 0.067/0.014 | 0.061/0.014 |
| 300/1500 psi | 0.201/0.041 | 0.197/0.038 | 0.212/0.040 | 0.210/0.049 | 0.237/0.068 |

Referring now to FIGS. 2–7, surface profiles for separator plates are shown. FIG. 2 shows a new separator plate having a surface roughness of about Ra 6.0 μin.

FIG. 3 shows Example D having 0% carbon material tested, having an Ra of about 7.6 μin.

FIG. 4 shows Example E having about 5% carbon material tested, having an Ra of about 6.0 μin.

FIG. 5 shows Example F having about 10% carbon material, having an Ra of about 5.6 μin.

FIG. 6 shows Example G having about 15% carbon material, having an Ra of about 11.5 μin. with a scar depicted thereon.

FIG. 7 shows Example H having about 20% carbon material, having an Ra of about 11.7 μin., having two scars shown thereon.

Table 6 below shows the percent of area carbon for Examples D, E, F, G and H before the tests and after the tests.

TABLE 6

| Area % of Carbon | Ex. D | Ex. E | Ex. F | Ex. G | Ex. H |
|---|---|---|---|---|---|
| Before Test | 5% | 35% | 52% | 61% | 73% |
| After Test | 3% | 52% | 65% | 67% | 80% |

The above data in Tables 4 and 5 and in FIGS. 2–7 show a series of fibrous base materials with different percentage of carbon coverage on the surface which were tested for break-in behavior. It is to be noted that Examples E and G having a 5% and 10% carbon coverage, by weight, have a beater break-in behavior than Example D having 0% carbon coverage. Both Examples E and F have similar mid point dynamic coefficient of frictions as Example D at cycle 200.

The Example H, having about 20% carbon coverage, had a large drop off of the dynamic coefficient and also a lower dynamic coefficient of friction than Example D having 0% carbon coverage at cycle 200.

Figure 8:
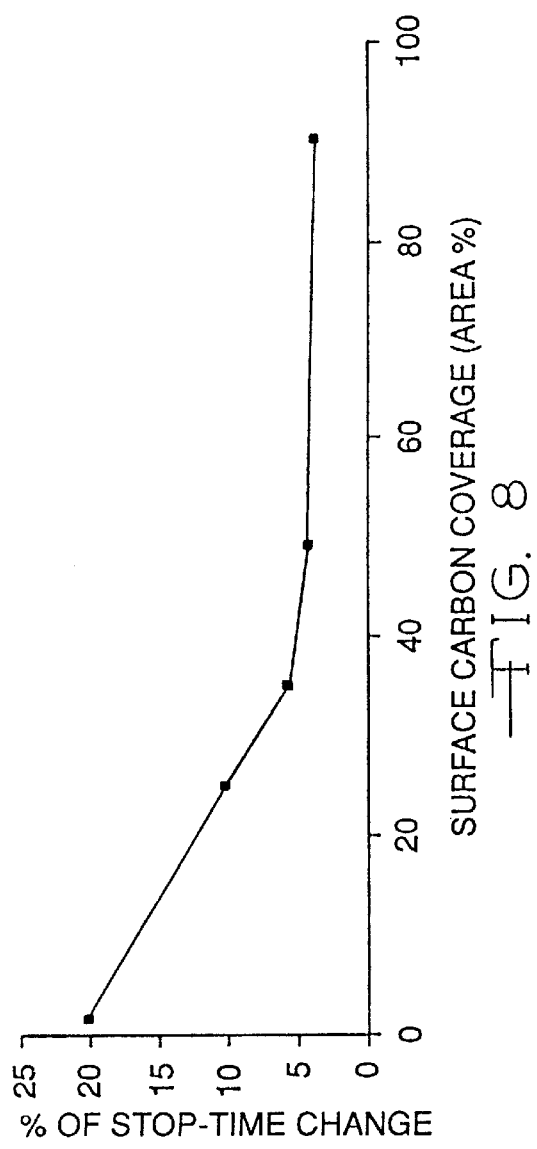
FIG. 8 is a graph showing the percent of stop time change versus the surface carbon coverage (area of percent) for Examples D, E, F, G and H, respectively.
Figure 9:
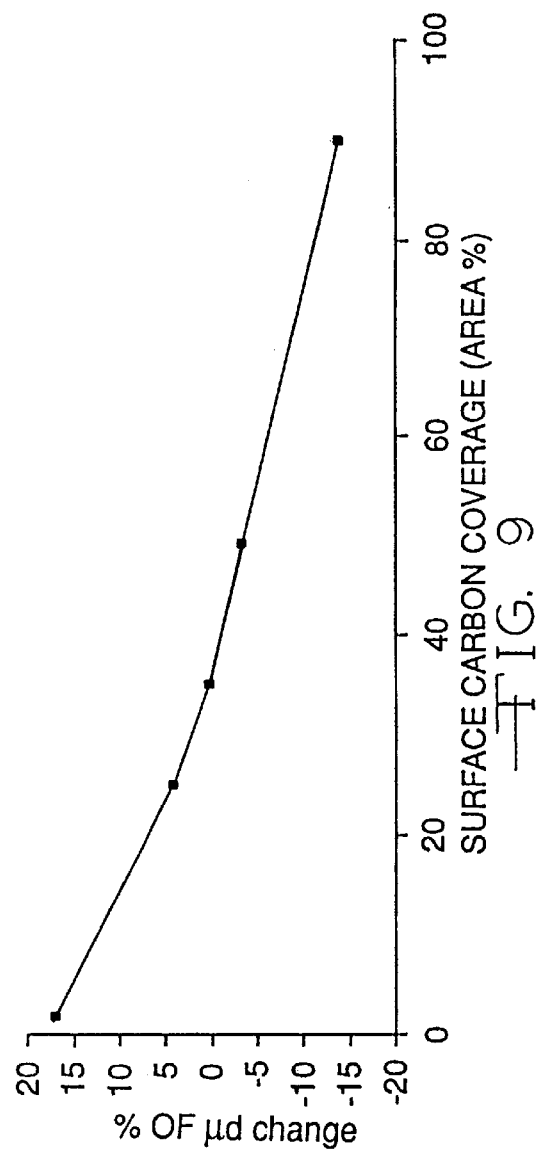
FIG. 9 is a graph showing the percent of μd change versus surface carbon coverage (area of percent) for Examples D, E, F, G and H.

It is to be noted that there is a relationship between the percentage of dynamic coefficient of friction change and the surface carbon coverage (area of percent). There is also a relationship between the percent stop time change and the surface carbon coverage (area of percent). These relationships are shown in FIGS. 8 and 9.

EXAMPLE 3

Example 3 shows the effect of carbon coverage on fibrous base materials in long-term durability tests. Example I comprises about 25% aramid fibers (CSF about 450–500), about 30% cotton fibers, about 20% synthetic graphite and about 25% diatomaceous earth.

Example J comprises about 25% aramid fibers (CSF about 580–640), 20–30% cotton fibers, about 20–25% synthetic graphite and about 20–25% diatomaceous earth. Example E is as stated above and Example K, comprises about 40–50% aramid fibers (CSF about 450–500), about 20–25% synthetic graphite, about 25–30% diatomaceous earth, and optionally about 0–7% aramid pulp.

The Example E resin has very good break-in behavior and the very good high speed durability. It should be noted that Example J also had a better durability than the Example I even though neither Example J nor I had carbon particles.

Figure 10:
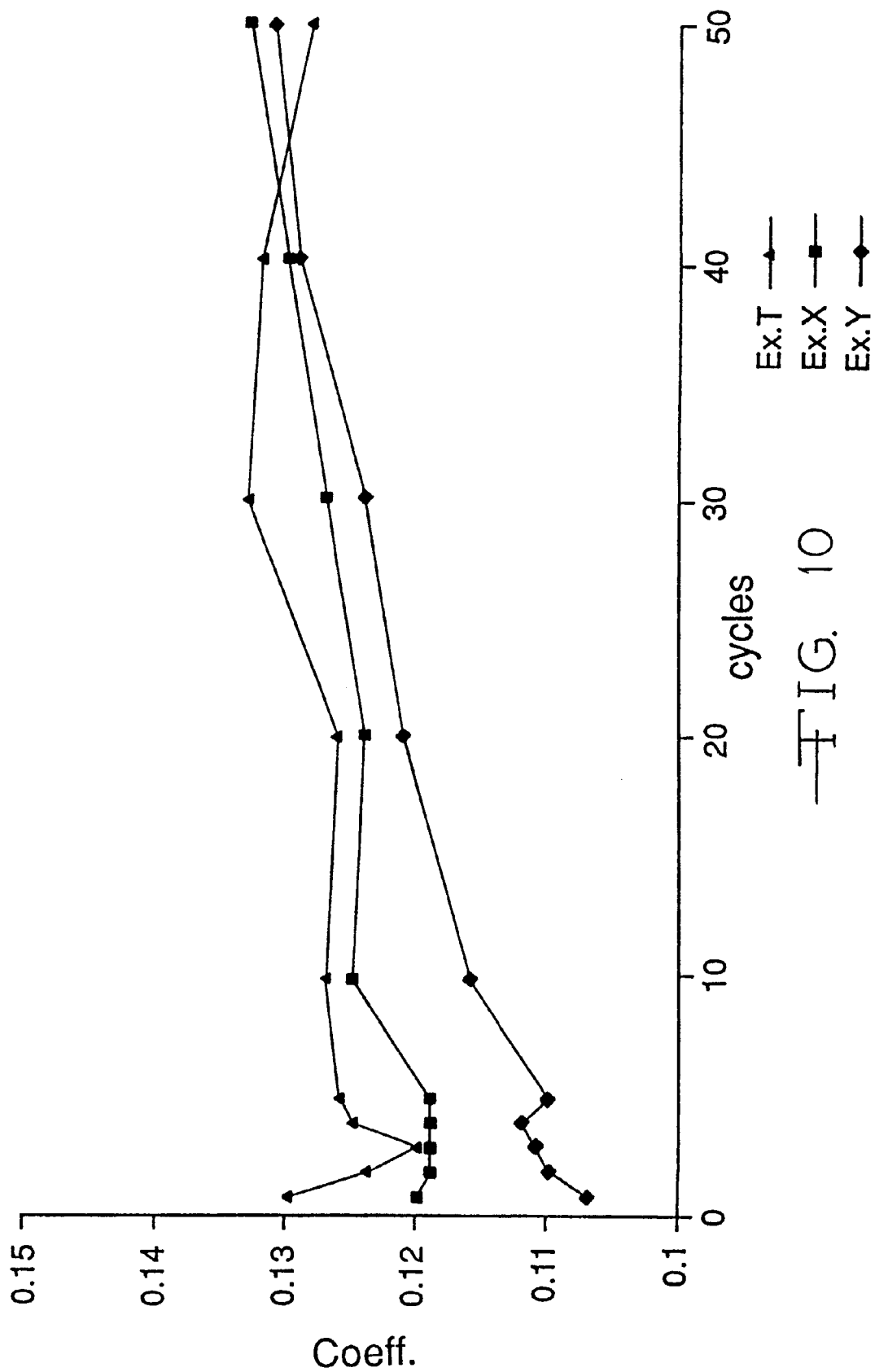
FIG. 10 is a graph showing the initial coefficient of friction change as the cycles increase for Examples I, E and J.
Figure 11:
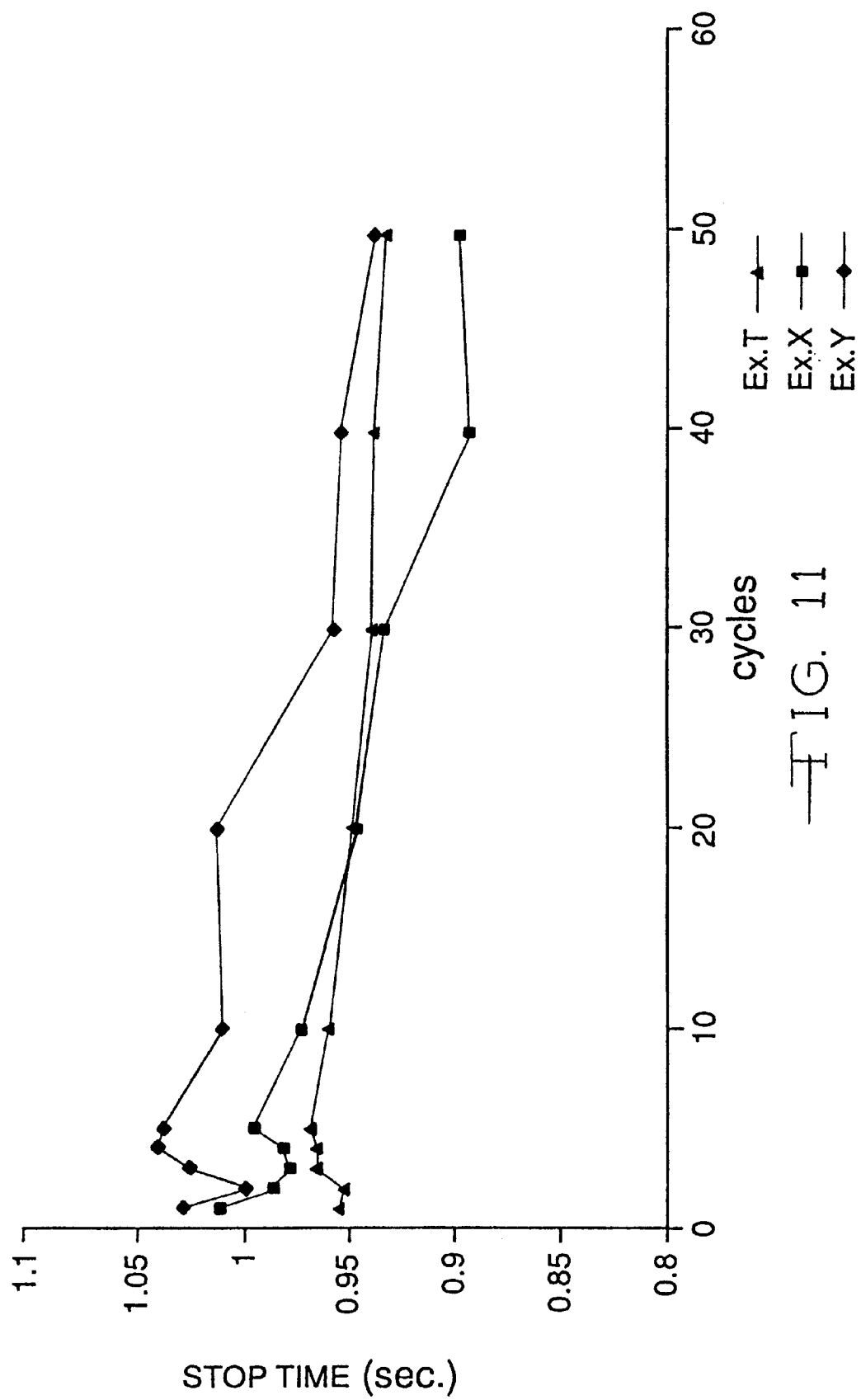
FIG. 11 is a graph showing the initial stop time in second versus cycles for Examples I, E and J.

FIG. 10 shows the initial coefficient of friction change for Examples I, E and J. FIG. 11 shows the initial stop time change for Examples I, E and J.

EXAMPLE 4

Figure 12:
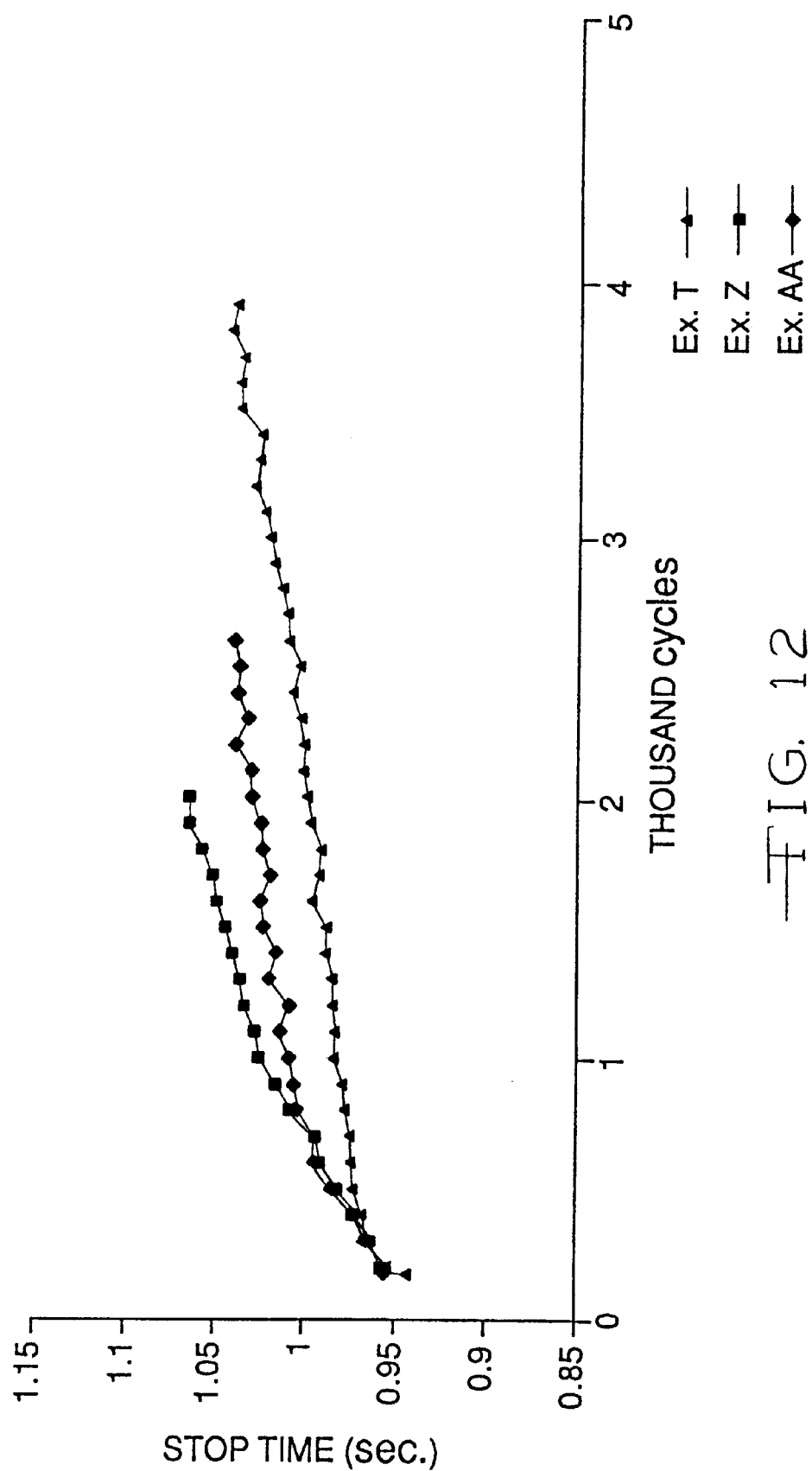
FIG. 12 is a graph showing a high energy durability test showing the stop time face for thousands of cycles for Examples E, K and L.

The high energy durability test according to Procedure 5030CN are shown in FIG. 12.

FIG. 12 shows the stop time fade for Examples E, K and L. It is noted that the Example E had a stop time fade at almost 4000 cycles, while the Example L had a stop time fade of greater than 2500 cycles and that the stop time was less than about 1.05 seconds. It is seen in Example E that it has the best durability of all materials tested under this 5030CN procedure showing high inertia durability. Example E is the carbon deposit material (5% carbon deposition). Example L and K are non-carbon deposit materials (0% carbon deposit).

EXAMPLE 5

As seen in Table 7 below, the Example E which has about 5% carbon particle secondary layer shows good friction behavior, including good curve shape ratings and good coefficients of frictions as compared with Examples I and J.

Figure 13:
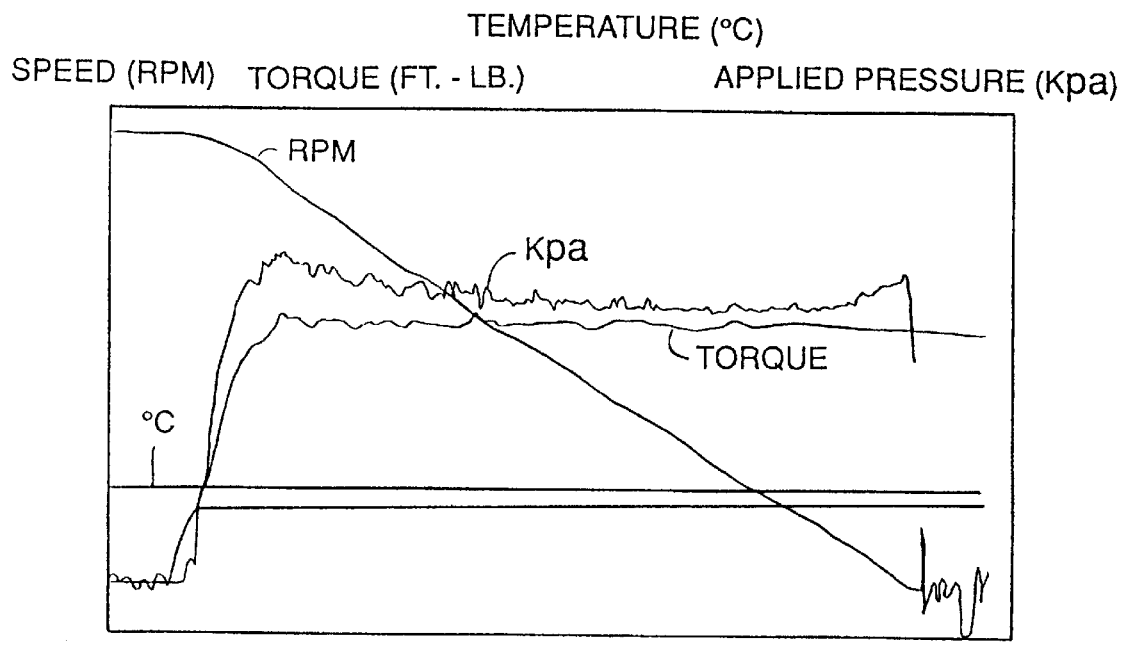
FIG. 13 is a graph showing the curve shape for Example I impregnated with a phenolic resin at 35% to 40% pick-up at level B at 70 cycles.
Figure 14:
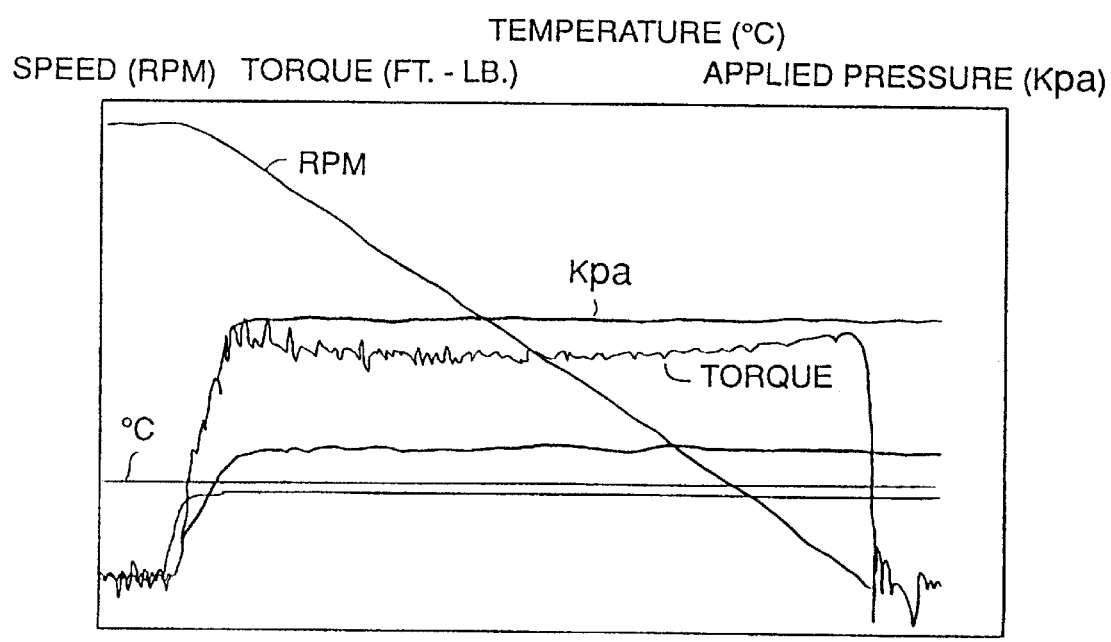
FIG. 14 is a graph showing the curve shape for Example I impregnated with a phenolic resin at 35% to 40% pick-up at level C at 95 cycles.
Figure 15:
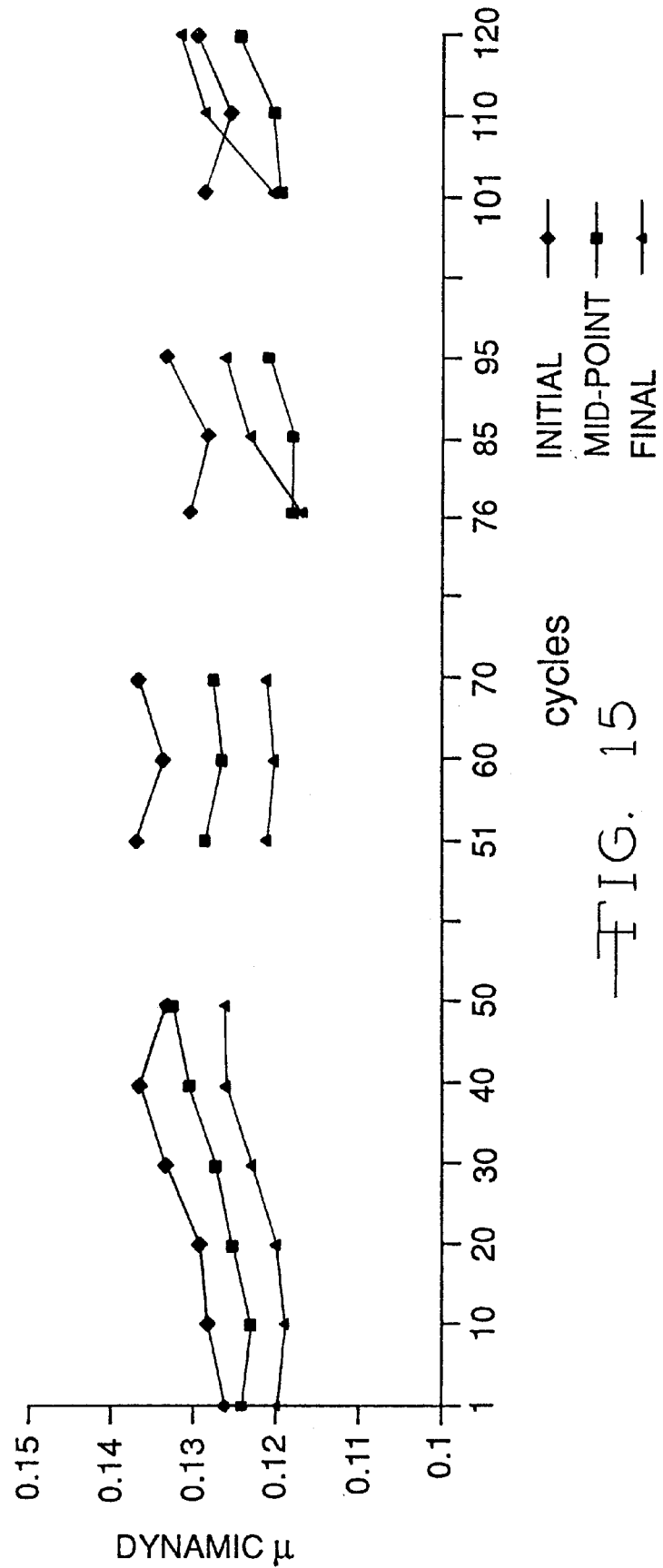
FIG. 15 is a graph showing the dynamic coefficient of friction for levels A, B, C and D for Example I showing the initial, mid point and final coefficients of friction.

FIGS. 13, 14 and 15 show the coefficient of friction curved shapes for Example I which does not contain carbon deposit for levels A, B, C and D showing the initial mid point and final coefficient of frictions.

FIG. 13 and 14 show the engagement torque characteristics for friction materials without a carbon deposit (relative rotation speed=1400 RPM in FIG. 13 and relative rotation speed=2400 RPM in FIG. 37). FIG. 15 shows the dynamic coefficients of friction ($\mu$) for the friction materials without a carbon deposit at various rotation speeds.

Figure 16:
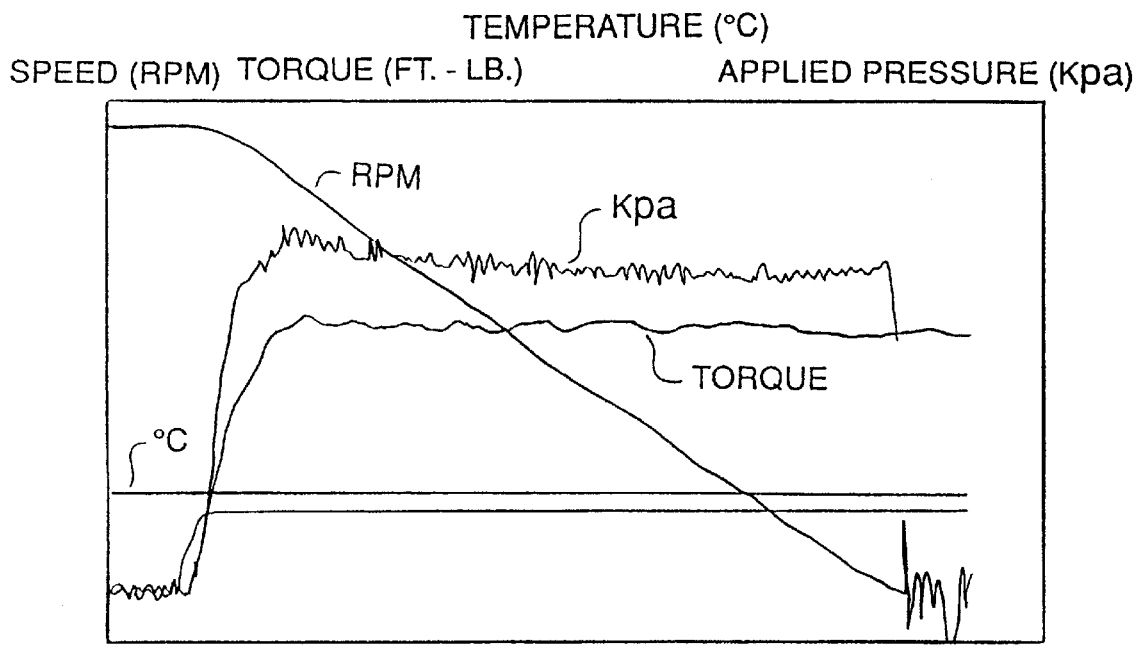
FIG. 16 is a graph showing the curve shape for Example E impregnated with a phenolic resin at 35% to 40% pick-up at level B at 70 cycles.
Figure 17:
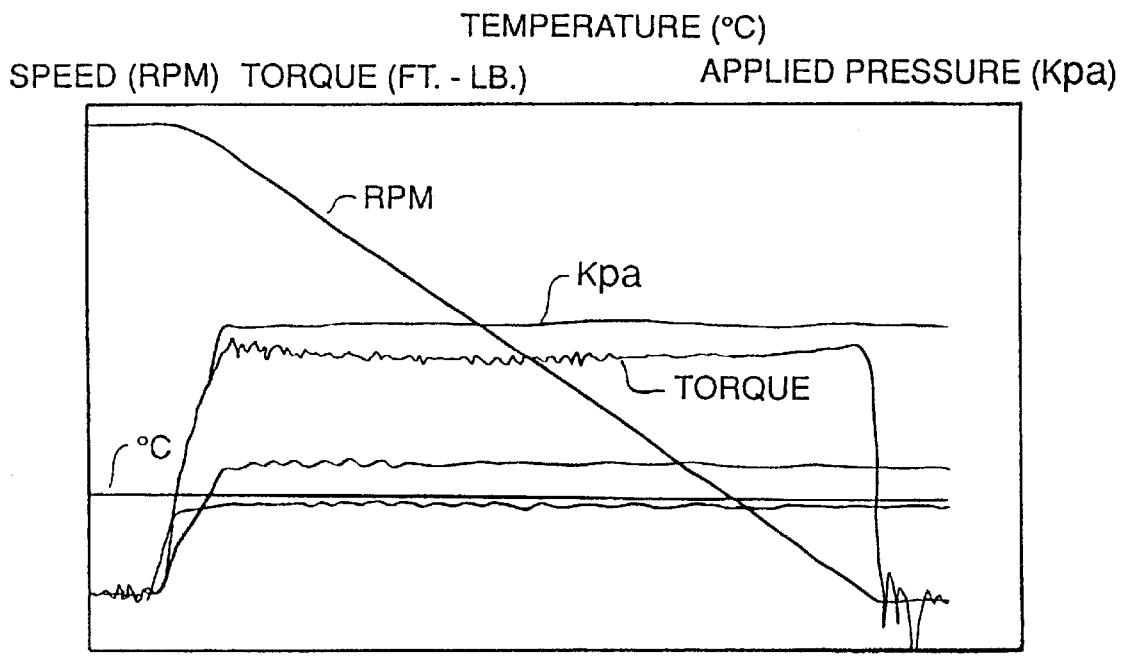
FIG. 17 is a graph showing the curve shape for Example E impregnated with a phenolic resin at 35% to 40% pick-up at level C at 95 cycles.
Figure 18:
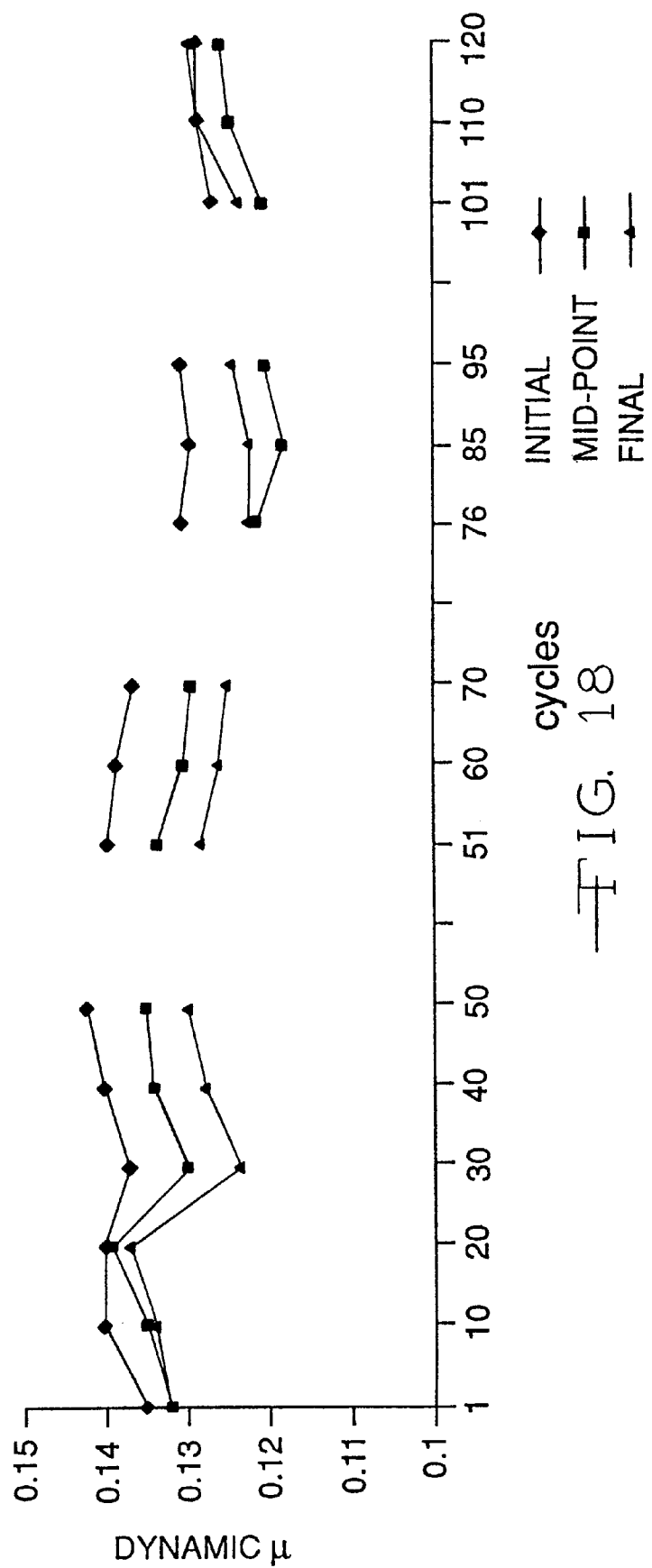
FIG. 18 is a graph showing the dynamic coefficient of friction for levels A, B, C and D for Example E showing the initial, mid point and final coefficients of friction.

FIGS. 16, 17 and 18 show the curve shapes for the Example E comprising a fibrous base material having a less fibrillated aramid fibers (CSF about 580–640) and a secondary layer of about 5%. The Example E is impregnated with a phenolic resin at about 35% to 40% pick-up. FIGS. 16, 17 and 18 show the initial mid point and coefficient of friction for levels A, B. C and D.

FIGS. 16 and 17 show the engagement torque characteristics for friction materials with a 5% carbon deposit (relative rotation speed=1400 RPM in FIG. 16 and relative rotation speed=2400 RPM in FIG. 17). FIG. 18 shows the dynamic coefficients of friction for the friction materials with a 5% carbon deposit at various rotation speeds.

The FIGS. 13–18 show that the Example E has good curve shape rating and good coefficients of friction. The fibrous base material having a secondary layer of carbon deposit has a higher friction durability due to higher thermal conductivity, larger pore size and greater liquid permeability of the primary layer.

TABLE 7

Torque Curve Shape Evaluation

|  | Ex. E 5 %-carbon | Ex. I | Ex. J |
|---|---|---|---|
| Rate B | 4/5 | 1 | 1 |
| C | 4 | 1 | 1 |
| Coeff. A | 0.143 | 0.132 | 0.134 |
| B | 0.137 | 0.127 | 0.132 |
| C | 0.129 | 0.121 | 0.120 |
| D | 0.131 | 0.125 | 0.119 |
| Break-in % | *2.0 | *2.1% | *2.1 |
| Stop-time/µ | 0.7 | 6.40 | 1.5 |

EXAMPLE 6

Example M is a carbon deposit material comprising a primary layer of about 43% less fibrillated aramid fibers (CSF of about 625), about 20% carbon fibers, about 15% carbon particles such as graphite, about 20% filler material, such as celite, and, about 2% Kynol® type phenolic fibers; and a secondary layer of about 3 to about 5% carbon particles deposited at about 6 lbs. In certain embodiments, it is desirable to use a retention aid to help adhere the carbon particles of the secondary layer on the surface of the fibrous base material.

The Example M was compared to a high energy material comprising 10%, by weight, cotton fibers; 70%, by weight, aramid fibers; about 15% carbon particles; 5%, by weight, carbon fibers, and 30%, by weight, celite filler.

Figure 19A:
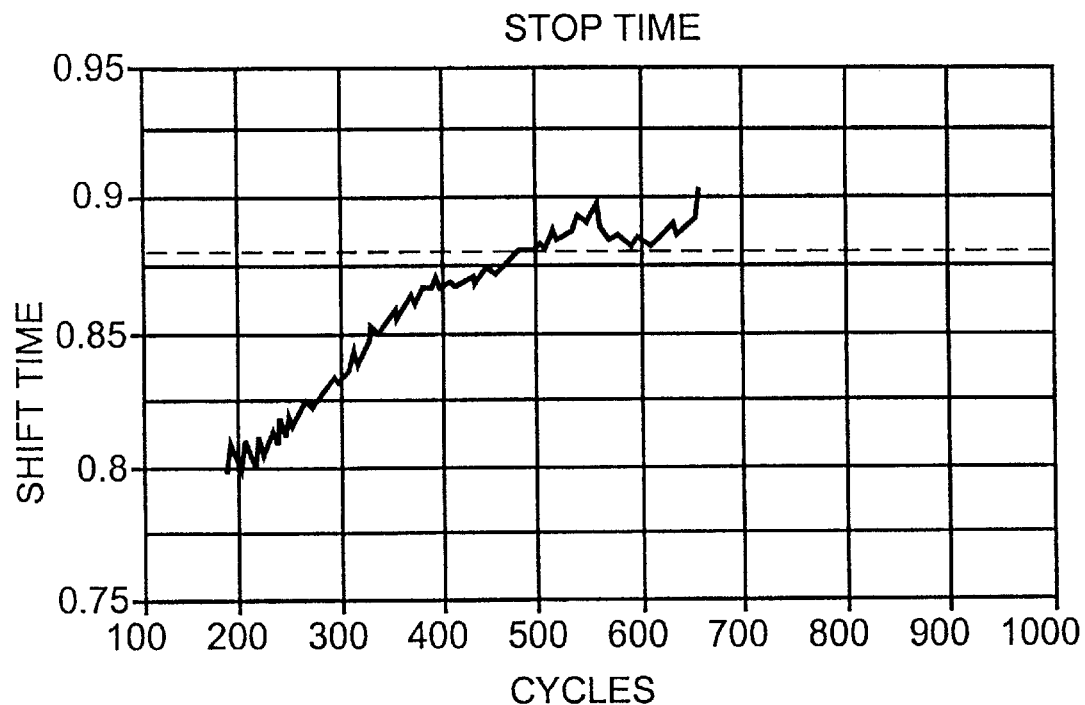
FIGS. 19A and 19B are graphs showing the stop time as measured by shift time versus cycles for a comparative ⊥ high energy material (FIG. 19A) and a carbon deposit material, Example M, (FIG. 19B).
Figure 19B:
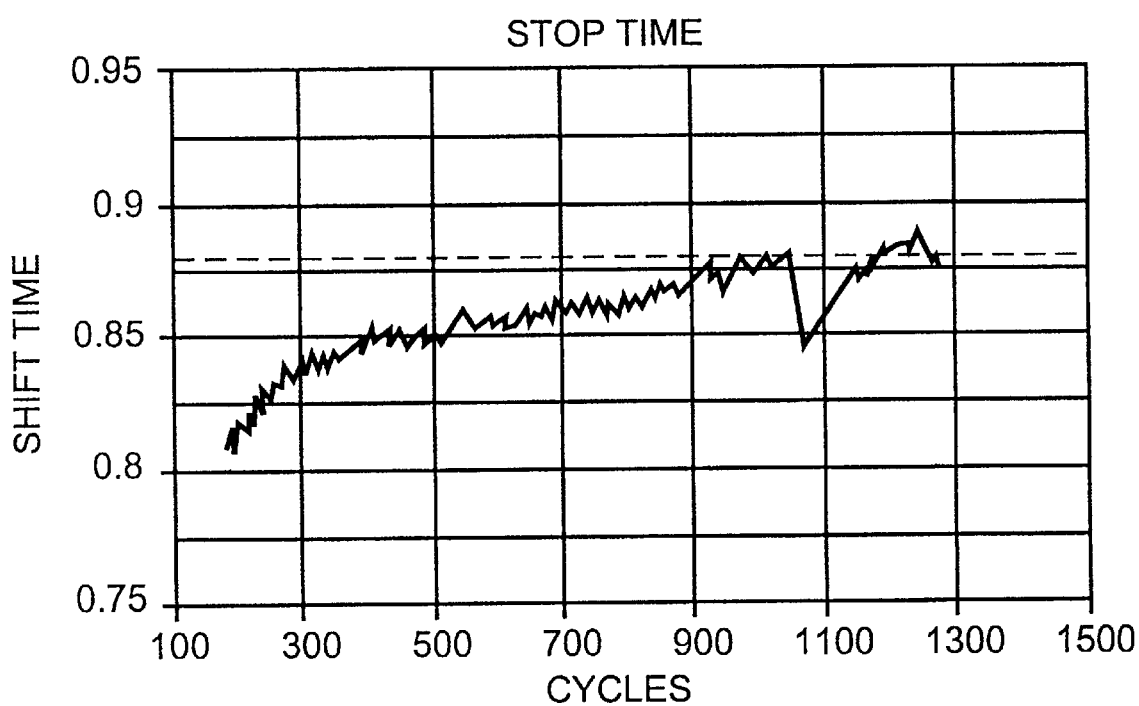

FIGS. 19A and 19B show the results of a stop time test comparing the shift time versus cycles for a comparative ⊥ high energy material (FIG. 19A) and the carbon deposit material, Example M, (FIG. 19B). FIG. 19B shows that the shift time is more stable and that there is less change as the number of cycles increases.

Figure 20A:
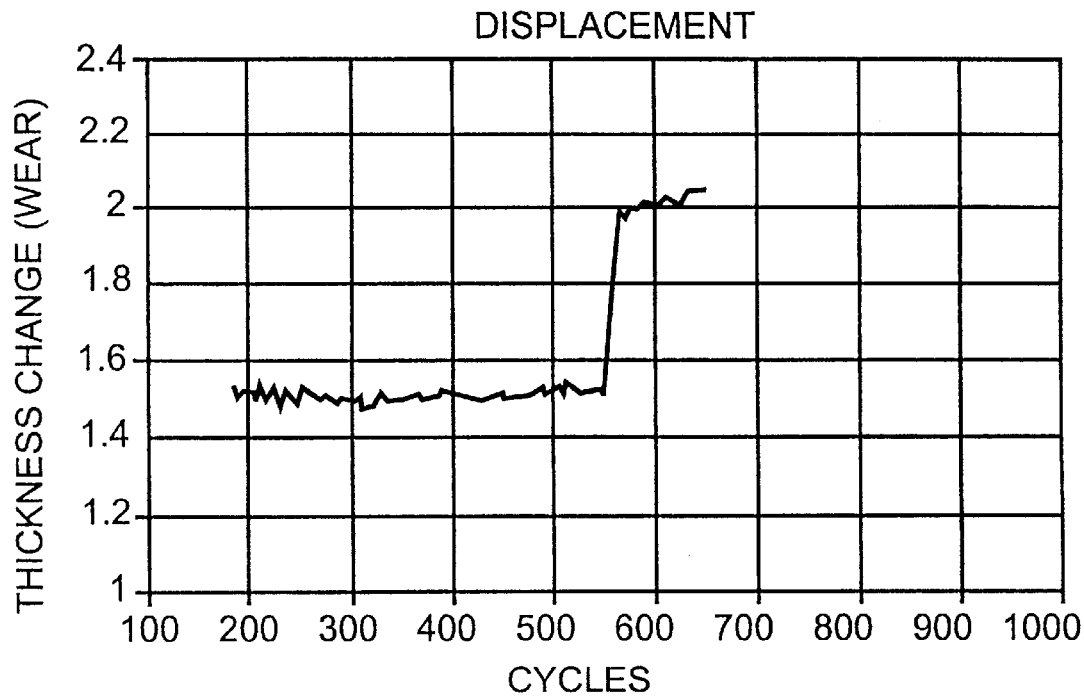
FIGS. 20A and 20B are graphs showing displacement as measured by thickness change, or wear, versus cycles for a the comparative ⊥ high energy material (FIG. 20A) and a carbon deposit material, Example M, (FIG. 20B).
Figure 20B:
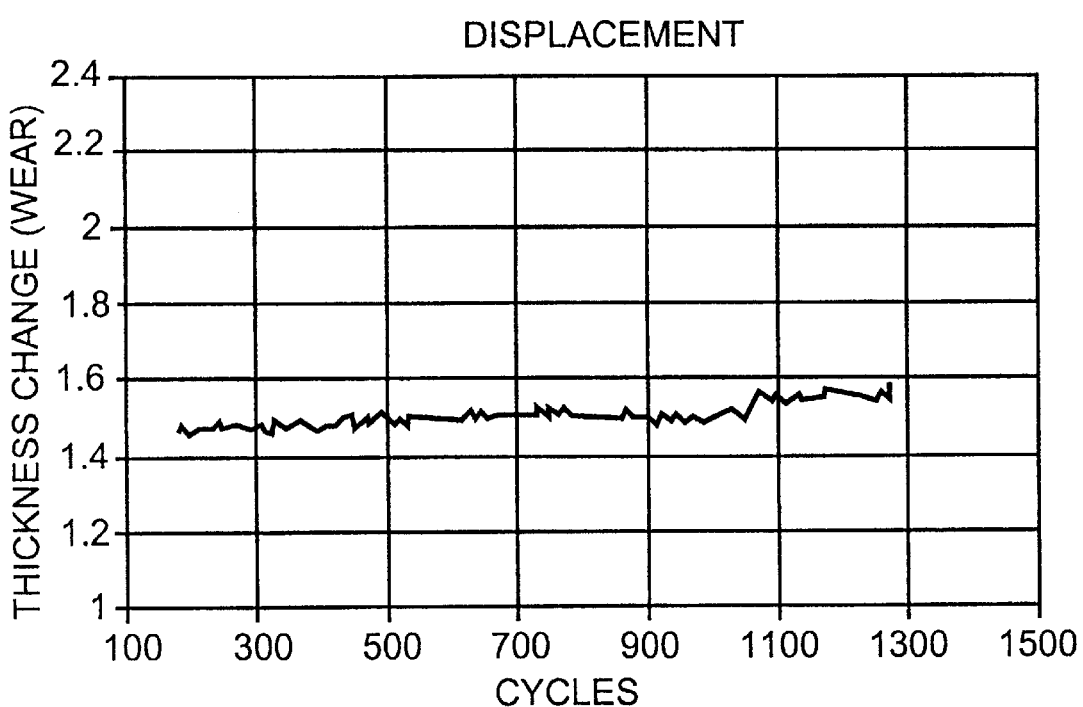

FIGS. 20A and 20B show the results of a displacement test comparing the thickness changes (mm) which indicate wear of the friction lining, versus cycles. FIG. 20B shows that Example M has less wear over more cycles, while the comparative ⊥ material, as shown in FIG. 20A, shows failure due to high wear.

Figure 21A:
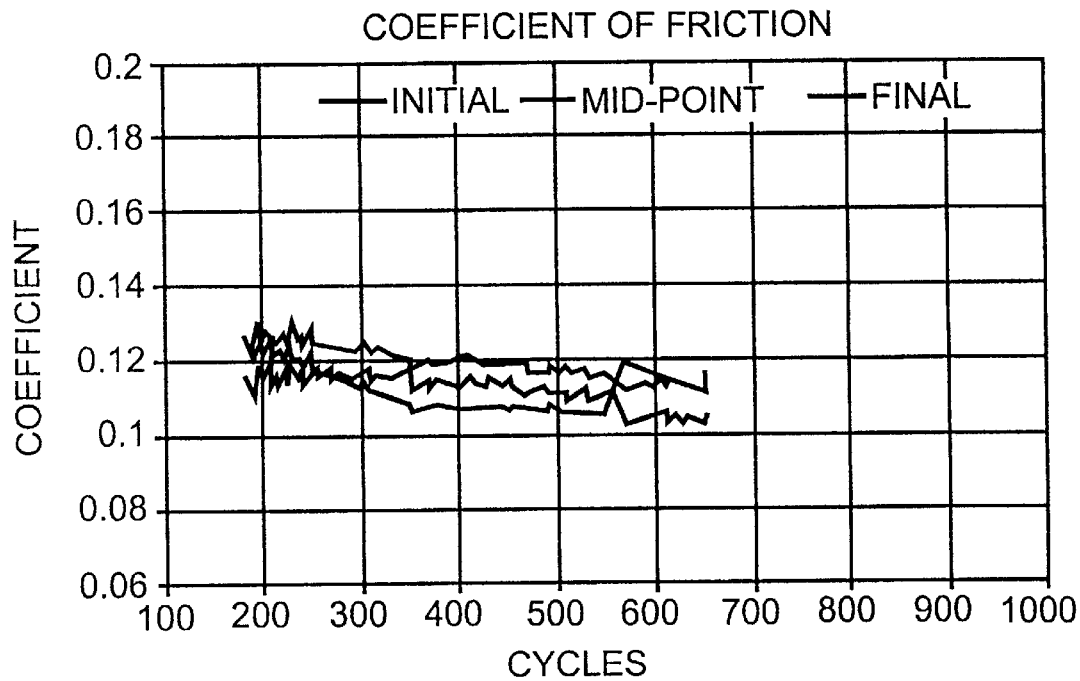
FIGS. 21A and 21B are graphs showing the initial, mid-point and final coefficients of friction versus cycles for the comparative ⊥ high energy material (FIG. 21A) and a carbon deposit material, Example M, (FIG. 21B).
Figure 21B:
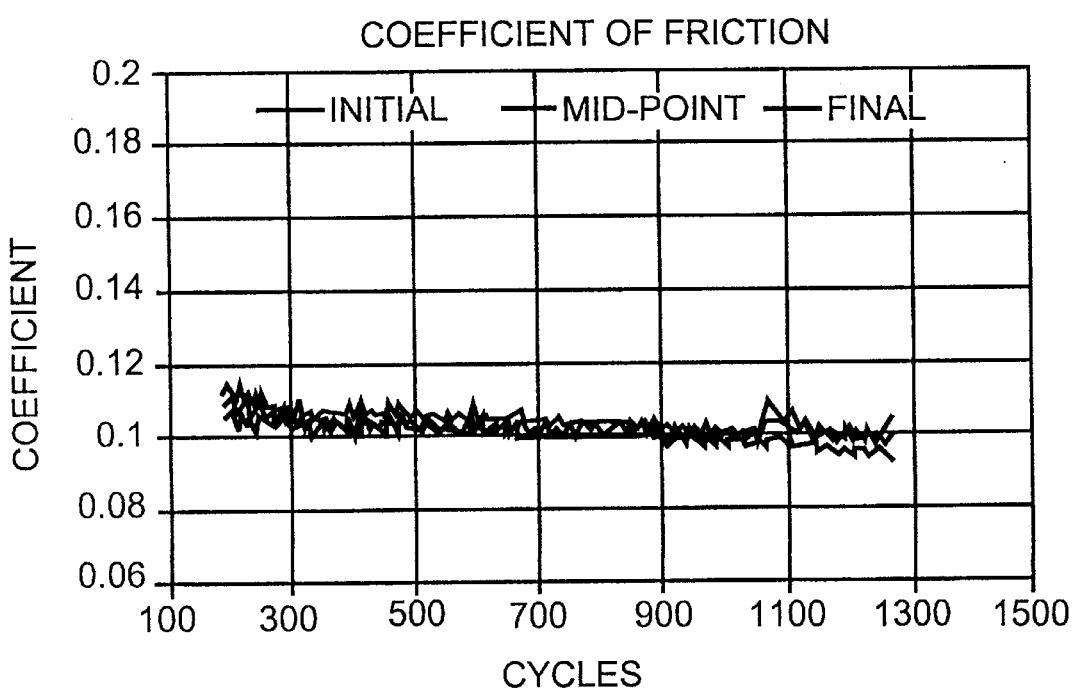

FIGS. 21A and 21B show the results of a coefficient of friction tests for initial, mid-point and final values versus cycles, where the highest value is the initial coefficient of friction and the lowest value is the final coefficient of friction. FIG. 20B shows that Example M has more similar coefficient of friction curves for the initial, mid-point and final coefficients of friction, than the comparative ⊥ material, as shown in FIG. 21A.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

I claim:

1. A non-asbestos friction material comprising a fibrous base material impregnated with at least one curable resin; the fibrous base material comprising a porous primary layer and a secondary layer; the primary layer comprising, by weight, based on the primary layer about 10 to about 50% less fibrillated aramid fiber; about 5 to about 20% carbon particles; about 5 to about 25% carbon fibers; about 15 to about 35% filler material; about 0 to about 10% cotton fibers; and about 0.5 to about 5% phenolic novoloid fibers; the porous primary layer having an average pore diameter of about 2.0 to about 15 microns; the secondary layer comprising carbon particles on at least one surface of the primary layer, the carbon particles being present at about 0.2 to about 20%, by weight, based on the weight of the fibrous base material, the carbon particles covering about 3% to about 90% of the surface area of the primary layer.

2. The friction material of claim 1, wherein the primary layer comprises about 43% less fibrillated aramid fibers; about 20% carbon fibers; about 15% carbon particles, about 20% filler material; and about 2% novoloid phenolic fibers.

3. The friction material of claim 1, wherein the primary layer comprises less fibrillated aramid fibers having a freeness greater than about 450 on the Canadian Standard Freeness index, in an amount sufficient to provide high heat resistance and substantially uniform coefficient of friction to the friction material.

4. The friction material of claim 1, wherein the secondary layer comprises about 3% to about 5%, by weight, of carbon particles, based on the weight of the fibrous base material.

5. The friction material of claim 1, wherein the secondary layer comprises about 5% to about 15%, by weight, of carbon particles, based on the weight of the fibrous base material.

6. The friction material of claim 1, wherein the carbon particle size ranges from about 6 to about 50 microns.

7. The friction material of claim 1, wherein the area of coverage of the carbon particles on the primary layer is in the range of about 3 to about 80% of the surface area of the primary layer.

8. The friction material of claim 1, wherein the primary layer further comprises at least one retention aid to adhere the carbon particles on the surface of the primary layer.

9. The friction material of claim 8, wherein the retention aid comprises up to about 20% alum having a pH of about 4.5.

10. The friction material of claim 3, wherein the less fibrillated aramid fibers have a freeness of about 580–640 on the Canadian Standard Freeness index.

11. The friction material of claim 1, wherein the less fibrillated aramid fibers have average fiber lengths in the range of about 3 to about 6 mm.

12. The friction material of claim 1, wherein the filler comprises diatomaceous earth.

13. The friction material of claim 1, wherein the pore diameter ranges in mean average size from about 2.5 to about 12 microns.

14. The friction material of claim 1, wherein the primary layer has readily available air voids of at least about 50%.

15. The friction material of claim 1 impregnated with a phenolic resin or a modified phenolic resin.

16. The friction material of claim 15, wherein the friction material comprises approximately 25 to about 60% resin, by weight.

17. The friction material of claim 1, wherein the fibrous base material has been impregnated with a mixture of a phenolic resin and a silicone resin wherein the amount of silicone resin in the mixture ranges from approximately 5 to approximately 80%, by weight, based on the weight of the mixture, the friction material exhibiting high heat resistance and substantially uniform coefficient of friction.

18. The friction material of claim 17, wherein the phenolic resin is present in a solvent material and the silicone resin is present in a solvent material which is compatible with the solvent material of the phenolic resin.

19. The friction material of claim 17, wherein the amount of silicone resin present in the silicone-phenolic resin mixture ranges from about 20 to about 25%, by weight, based on the weight of the mixture.

20. The friction material of claim 17, wherein the amount of silicone resin present in the silicone resin mixture ranges from about 15 to about 25%, by weight, based on the weight of the mixture.

21. The friction material of claim 15, wherein the modified phenolic resin comprises an epoxy phenolic resin.

22. The friction material of claim 21, wherein the amount of epoxy resin present in the epoxy phenolic resin ranges from about 5 to about 25%, by weight, based on the weight of the epoxy phenolic resin.

23. The friction material of claim 22, wherein the amount of epoxy resin present in the epoxy phenolic resin ranges from about 10 to about 15%, by weight, based on the weight of the epoxy phenolic resin.

24. A process for producing a non-asbestos friction material comprising coating about 3% to about 90% of the surface area of at least one surface of a porous fibrous base material having an average pore diameter of about 2.5 to about 12 microns with carbon particles, the carbon particles being present at about 0.2 to about 20%, by weight, based on the weight of the fibrous base material, impregnating the carbon coated fibrous base material with at least one phenolic resin or modified phenolic resin, and thereafter curing the impregnated carbon coated fibrous base material at a predetermined temperature for a predetermined period of time; wherein the fibrous base material comprises, in weight percent, based on the weight of the fibrous base material, about 10 to about 50% less fibrillated aramid fiber; about 5 to about 20% carbon particles; about 5 to about 20% carbon fibers; about 15 to about 35% filler material; about 3 to about 10% cotton fibers; and about 0.5 to about 5% phenolic novoloid fibers.

25. A process for producing a non-asbestos friction material comprising mixing a phenolic resin with a silicone resin, impregnating a fibrous base material with the silicone-phenolic resin mixture, the fibrous base material comprising a porous primary layer and a secondary layer; the primary layer comprising the primary layer, by weight, based on the primary layer about 10 to about 50% less fibrillated aramid fiber; about 5 to about 20% carbon particles; about 5 to about 25% carbon fibers; about 15 to about 35% filler material; about 0 to about 10% cotton fibers; and about 0.5 to about 5% phenolic novoloid fibers; the porous primary layer having an average pore diameter of about 2.0 to about 15 microns; the secondary layer comprising carbon particles on at least one surface of the primary layer, the carbon particles being present at about 0.2 to about 20%, by weight, based on the weight of the fibrous base material, the carbon particles covering about 3% to about 90% of the surface area of the primary layer; and, thereafter heating the carbon coated impregnated fibrous base material to cure the phenolic resin and the silicone resin.

* * * * *